United States Patent
Sridhar et al.

(10) Patent No.: US 12,133,032 B2
(45) Date of Patent: Oct. 29, 2024

(54) OPTICAL SWITCH WITH INTEGRATED FAST PROTECTION

(71) Applicant: Equinix, Inc., Redwood City, CA (US)

(72) Inventors: Balakrishnan Sridhar, Ellicott City, MD (US); Iwan Kartawira, San Jose, CA (US); Manveer Singh, Tracy, CA (US); Mohan Rao G. Lingampalli, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 353 days.

(21) Appl. No.: 17/647,862

(22) Filed: Jan. 13, 2022

(65) Prior Publication Data

US 2023/0224614 A1    Jul. 13, 2023

(51) Int. Cl.
*H04Q 11/00* (2006.01)
(52) U.S. Cl.
CPC ................ *H04Q 11/0005* (2013.01)
(58) Field of Classification Search
CPC ......... H04Q 11/0005; H04Q 2011/005; H04Q 11/0062; H04B 10/27; H04L 49/35
See application file for complete search history.

(56) References Cited

U.S. PATENT DOCUMENTS

| | | | |
|---|---|---|---|
| 6,243,510 B1 | 6/2001 | Rauch | |
| 8,068,715 B2 | 11/2011 | Kewitsch | |
| 8,107,360 B2 | 1/2012 | Patel et al. | |
| 8,181,229 B2 | 5/2012 | Macauley | |
| 8,218,967 B1 * | 7/2012 | Stevens | H04Q 11/0005 398/55 |
| 8,401,349 B2 | 3/2013 | Chen | |
| 9,008,484 B2 | 4/2015 | Takeuchi et al. | |
| 9,450,893 B2 | 9/2016 | Kuo et al. | |
| 9,736,556 B2 | 8/2017 | Lingampalli | |
| 10,345,526 B2 | 7/2019 | Kewitsch et al. | |
| 10,757,489 B2 | 8/2020 | Menard et al. | |
| 10,895,691 B2 | 1/2021 | Kewitsch | |

(Continued)

FOREIGN PATENT DOCUMENTS

WO    WO-2016051442 A1 *    4/2016    ............. H04B 10/27
WO        2019224657 A1     11/2019

OTHER PUBLICATIONS

International Search Report and Written Opinion of International Application No. PCT/US2023/060639 dated May 9, 2023, 16 pp.

(Continued)

*Primary Examiner* — Pranesh K Barua
(74) *Attorney, Agent, or Firm* — Shumaker & Sieffert, P.A.

(57) ABSTRACT

An example optical switch includes a plurality of input ports and a plurality of output ports, a cross-connect fabric having one or more inputs, one or more outputs, and a device to selectively cross-connect the inputs with the outputs. The optical switch includes an integrated fast optical switch comprising a first input, a first output, and a second output, wherein the first input is connected to a first one of the outputs of the cross-connect fabric, and wherein the integrated fast optical switch has a switching time that is less than a switching time of the cross-connect fabric to switch the first input between the first output on a path to a first output port of the plurality of output ports and the second output on a path to a second output port of the plurality of output ports.

20 Claims, 9 Drawing Sheets

(56) References Cited

U.S. PATENT DOCUMENTS

| | | | | |
|---|---|---|---|---|
| 2006/0013144 | A1* | 1/2006 | Rodrigo | H04Q 11/0005 |
| | | | | 398/45 |
| 2013/0236173 | A1* | 9/2013 | Beshai | H04Q 11/0005 |
| | | | | 398/45 |
| 2015/0043905 | A1* | 2/2015 | Graves | H04Q 11/0005 |
| | | | | 398/45 |
| 2021/0311261 | A1* | 10/2021 | Zheng | G02B 6/3546 |

OTHER PUBLICATIONS

Jatoba-Neto et al., "Scaling Optical Networks Using Full-Spectrum Spatial Switching," 2017 IEEE 18th International Conference on High Performance Switching and Routing (HPSR), 6 pp., Jun. 2017.

Liu, "Patch Panel vs Switch: What's the Difference?," medium.com, May 10, 2018, 5 pp.

Marom et al., "Survey of Photonic Switching Architectures and Technologies in Support of Spatially and Spectrally Flexible Optical Networking [Invited]," Journal of Optical Communications and Networking, vol. 9, No. 1, Jan. 2017, 26 pp.

Mendinueta et al., "Wavelength and Space Division Packet Super-Channel Switching System for Future Data Center Optical Networks with a Switching Capacity of 53.3 Tb/s/port", 2018 20th International Conference on Transparent Optical Networks (ICTON), IEEE, Jul. 2018, 4 pp.

* cited by examiner

OPTICAL SWITCH WITH INTEGRATED FAST PROTECTION

TECHNICAL FIELD

This disclosure generally relates to optical networks and, more specifically, to optical switches.

BACKGROUND

Optical interconnection services within a data center or within data center clusters, e.g., processing, storage, and/or routing of network traffic between networking resources (e.g., within customer cages and/or racks), often uses manual connections facilitated by large patch panels to provide the interconnections. Optical interconnection services may be at least partially automated by using large banks of patch panels where the connections are automated using robotic elements to complete or remove an optical circuit. Optical interconnections using mechanical switching, such as robotic elements, may have slow optical switching speed in relation to restoration or protection switching times required in optical networks. By contrast, optical interconnections using all-optical switching such as beam steering techniques have fast optical switching times that make them suitable for protection switching or optical restoration. Data center switch fabrics may employ both slow and fast optical switches to provide optical interconnections services with differing levels and/or combination of speed, performance, redundancy, protection, and/or reliability. In general, fast switches are more expensive and do not scale in size as a slow switch.

SUMMARY

This disclosure describes an optical switch that integrates a fast optical switch into a high port count mechanical optical switch to provide fast protection services. A large optical switch having one or more optical switches can provide a large number of ports and typically includes a robotic or other mechanical device to switch an input port among various output ports. In an example, an optical switch includes a slow switch fabric and a fast optical switch to provide fast protection services to optical connections established over the slow switch fabric. The fast optical switch may have a small number of input and output ports relative to the slow switch fabric. The fast optical switch may be a photonic switch. The fast optical switch may rely on mechanical switching, on Micro-Electro-Mechanical System (MEMS)-based switching, waveguide-based switching, or another type of optical switching. The fast optical switch of the optical switch may have a faster switching time relative to the slow switch fabric of the optical switch. The fast optical switch of the optical switch may have a switching time that is less than 1 second or 1000 milliseconds (ms), or less than 100 milliseconds, or less than 10 ms, as examples.

In an example of the optical switch, the fast optical switch may have one or more output ports connected to respective output ports of the optical switch, the fast optical switch may have an input port connected to an output of a cross-connect fabric of the optical switch, and the cross-connect fabric may have an input connected to an input port of the optical switch. In another example of the optical switch, the fast optical switch may have one or more input ports connected to one or more output ports of the cross-connect fabric, and the fast optical switch may have one or more output ports connected to one or more input ports of the cross-connect fabric. Depending on a configuration of the cross-connect fabric, different input ports of the optical switch may be selected for switching to fast optical switch inputs.

Reconfiguration of the fast optical switch to switch an input port from a first output port to a second output port may therefore quickly redirect optical signals, received at the input port from the slow switch fabric, on a different optical path through the slow switch fabric and thereby to a different output port of the slow switch fabric. The fast optical switch thereby augments the high port count and switching ability of the slow switch fabric with the fast-switching time of the fast optical switch.

The techniques of the disclosure include one or more specific technical improvements that provide at least one practical application in the technical field of computer networks. As described herein, an optical switch that includes a fast optical switch connected to and augmenting a slow switch fabric of the optical switch may decouple the relatively slow speed configuration/reconfiguration operations for optical paths from relatively high speed protection and/or restoration operations for optical paths (such as from a hardware/software switch failure). In some examples, the optical switch includes a fast optical switch that may be integrated into and/or encapsulated within a slow switch. As such, the optical switch may enable configuration and/or reconfiguration to be sequential and/or "slow" (e.g., using mechanical and/or robotic switching schemes) without significantly affecting and/or disrupting the speeds of protection and restoration. This can reduce the complexity and/or increase the reliability of configuration/reconfiguration of all optical interconnection services involving the optical switch. The optical switch may improve a switch fabric by enabling optical interconnections utilizing fast protection services such as 1:1, 1:N, etc., to be grouped such that fast optical switching may be triggered autonomously and/or based on signaling from a remote node location. Additionally, the size of the fast optical switch may be scaled based on the size of the group of the channels that require redundancy and protection rather than the entire size of all optical interconnections, e.g., enabling smaller fast optical switches to be used. Further, a fast optical switch connected to slow switch fabric within the optical switch may enable optical interconnections utilizing fast optical switching speeds via the fast optical switch to be protected with a lower level of redundancy, e.g., fewer redundant optical interconnections through the fast optical switch, because the slow switch fabric may be reconfigured to re-route around the failed fast optical switch interconnection. As another example, the slow switch fabric of the optical switch can host facilities and resources for measuring and monitoring all optical paths, e.g., including, but not limited to, by performing optical time domain reflectometer (OTDR) measurement, optical performance monitoring (OPM), bit error rate (BER) monitoring, and the like.

In one example, this disclosure describes an optical switch including a plurality of input ports and a plurality of output ports; a cross-connect fabric having one or more inputs, one or more outputs, and a device to selectively cross-connect the inputs with the outputs; an integrated fast optical switch comprising a first input, a first output, and a second output, wherein the first input is connected to a first one of the outputs of the cross-connect fabric, and wherein the integrated fast optical switch has a switching time that is less than a switching time of a cross-connect fabric and/or a slow switch, to switch the first input between the first output on a path to a first output port of the plurality of output ports and the second output on a path to a second output port of the plurality of output ports.

In another example, this disclosure describes an interconnection system including a first data center interconnect; a second, different data center interconnect; an optical switch includes a plurality of input ports and a plurality of output ports; a cross-connect fabric having one or more inputs, one or more outputs, and a robotic mechanism to cross-connect the inputs to the outputs; an integrated fast optical switch comprising a first input, a first output, and a second output, wherein the first input is connected to a first one of the outputs of the cross-connect fabric, and wherein the fast optical switch has a switching time that is less than 1000 milliseconds to switch the first input between the first output on a path to a first output port of the plurality of output ports and the second output on a path to a second output port of the plurality of output ports, wherein the first output port of the plurality of output ports is connected to the first data center interconnect, and wherein the second output port of the plurality of output ports is connected to the second data center interconnect.

In another example, this disclosure describes a controller including processing circuitry coupled to a memory, the processing circuitry and memory configured to control an optical switch including a plurality of input ports and a plurality of output ports; a cross-connect fabric having one or more inputs, one or more outputs, and a robotic mechanism to cross-connect the inputs to the outputs; an integrated fast optical switch comprising a first input, a first output, and a second output, wherein the first input is connected to a first one of the outputs of the cross-connect fabric, and wherein the fast optical switch has a switching time that is less than 1000 milliseconds to switch the first input between the first output on a path to a first output port of the plurality of output ports and the second output on a path to a second output port of the plurality of output ports.

In another example, this disclosure describes a method including detecting, by a controller for an optical switch, a failure of a first data center interconnect connected to a first output port of the optical switch; and in response to the detecting the failure, outputting, by the controller for the optical switch, configuration data to configure a fast optical switch of the optical switch to switch from the first output port of the optical switch connected to the first data center interconnect to a second output port of the optical switch connected to a second data center interconnect.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
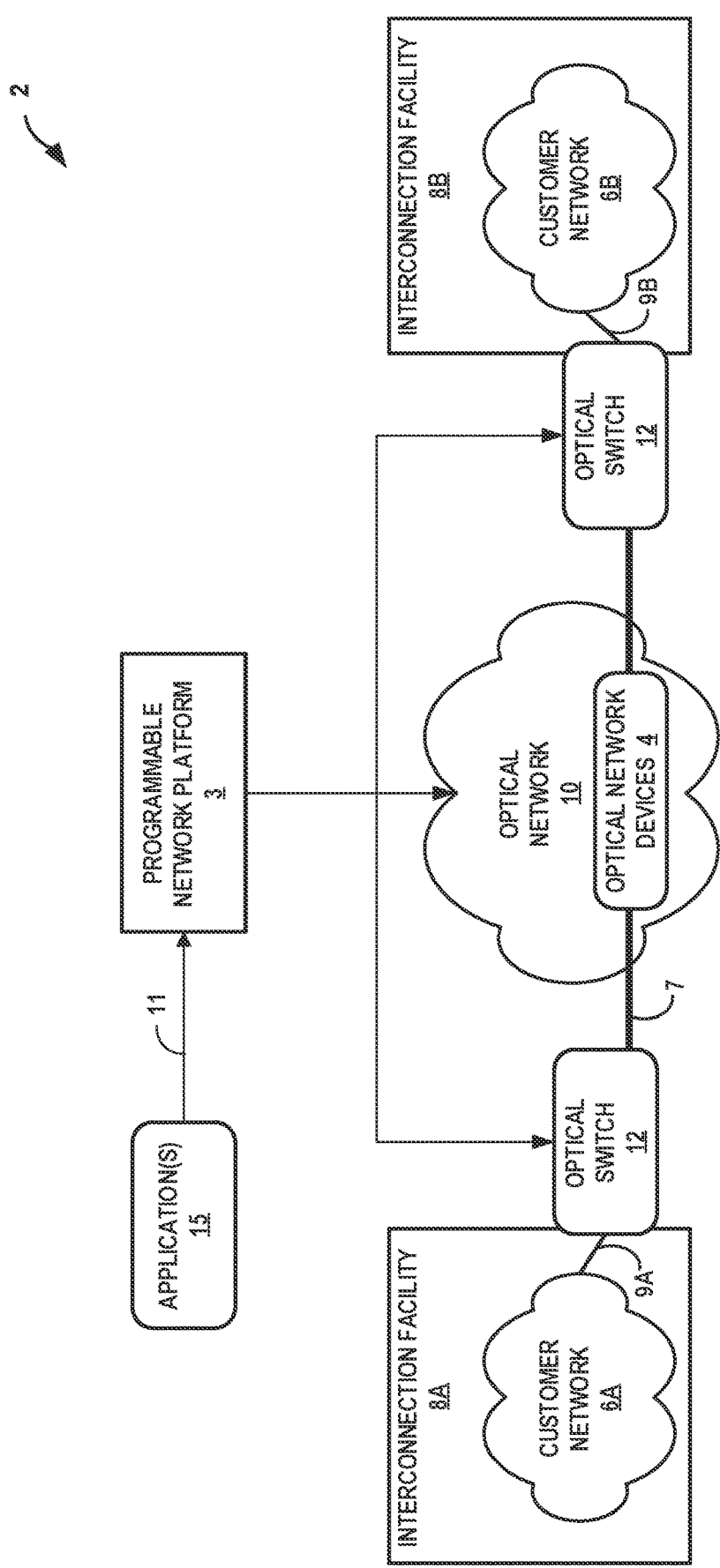
FIG. 1 is a block diagram illustrating an example interconnection system that incorporates an optical switch having a slow optical switch and an integrated fast optical switch, in accordance with one or more techniques of the disclosure.

Networking services provided to customers may have minimum quality of service (QoS) requirements. A QoS agreement may determine, at least in part, the cost of the service and may dictate the underlying architecture and design of the network. The QoS may dictate a certain level of availability, speed, bandwidth, and/or other properties for a network service. The availability of the service may be determined and/or affected by the overall reliability of the underlying network elements and other external factors such as fiber cuts and the like. Reliability of equipment may be characterized by a failure-in-time (FIT) rate, a mean time between failures (MTBF) value, or the like. The availability of the service may also be determined and/or affected by the time required to restore a service after an equipment failure or other failures such as at the physical fiberoptic cable plant and/or system. For example, even if the overall reliability of a particular equipment or element is high, the availability will be low if the time required to restore service is long.

Large, robotic switches are used to provide cross-connect or configuration services and may have a low failure rate. Robotic switches also hold the existing switch state even in the case of power or equipment failure. For example, when such failures occur, existing optical connections are not affected and there may be no impact on the availability of existing optical connections, and only new services cannot be added or dropped in such conditions. Such switches may be referred to herein as "slow optical switches."

Fast optical switches, by contrast, may be used to provide protection services, and may also have a low failure rate. However, the mean time to restore services utilizing fast optical switches may be large in the event of a failure, e.g., since all the connections through the switch may have to be disconnected, the switch may have to be swapped with a new switch, and all the connections may have to be reconnected. A fast optical switch may not hold its current connection state and/or switch configuration in case of power or equipment failure. For example, fast optical switches do not operate to provide switching passively without power, and all the services through a fast optical switch experiencing failure may be affected. The larger the fast optical switch, the larger the impact of a failure on the services.

Conventionally, improving the reliability and/or availability of protection services provided via a standalone fast optical switch requires additional hardening of power supplies and power supply backups, switch redundancy to meet the availability requirements, and also scaling a fast optical switch to the largest possible size on or before its first use, e.g., on "day 1," because the fast optical switch is used both for configuration and protection.

Fast optical switches may be deployed in pairs (e.g., redundant pairs) and all protected services may require duplication, and lower levels of protected services (e.g., M:N and the like) may not feasible. Redundancy may be used to mitigate the time to restore a failed component. Typically, only single-component failure is considered with the assumption that two simultaneous failures are improbable. Replacing a fast optical switch involves disconnecting all the input and outputs from the failed switch and reconnecting them to another switch, e.g., a manual operation and requires many hours to complete, and keeping spare (e.g., currently unused) large fast optical switches is expensive. For example, the time to restore a fast optical switch may be about 30 second per connection. A relatively small, 48 port-count fast optical switch may have a maximum restoration time of about 24 minutes and an average restoration time of about 12 minutes (e.g., only a portion of the ports may need restoration). A relatively larger, 384 port-count fast optical switch may have a maximum restoration time of about 192 minutes and an average restoration time of about 96 minutes. However, the maximum allowed annual down time allowed, per a QoS agreement, may be 60 minutes or less, or even 1 minute or less. The maximum annual downtime for a standalone fast optical switch with a 99% availability is about 3.7 days, with a 99.9% availability is about 8.8 hours, with a 99.99% availability is about 52.6 minutes, and an availability of 99.9999% would have an annual maximum downtime of about 31.5 seconds, e.g., a standalone fast optical switch would need a 99.9999% availability to provide a QoS with less than one-minute annual downtime. As such, standalone fast optical switches currently do not meet such QoS requirements, and redundancy is typically required to provide such services.

Fast and slow optical switches include differing tradeoffs. For example, slow optical switches may be lower cost, have higher scalability, and include the ability to maintain an interconnection in the event of a loss of power as compared with fast optical switches. Fast optical switches may be able to achieve switching speeds that slow optical switches cannot, e.g., to provide faster services and to provide optical interconnection protection via fast optical switching to redundant optical interconnection paths.

Cross-connection between optical clients within or between data centers may be provided by large, automated optical patch panel switches. The optical patch panel switches may be automated via a robotic mechanism to configure or reconfigure the patch panel sequentially or a few ports at a time. The time required to provision or un-provision a service using an automated patch panels is typically slow and on the order of seconds and/or minutes, and a large robotic patch panel may be referred to as a slow optical switch. The slow optical switch may be scalable to large port counts, e.g., thousands of ports. For example, slow optical switch size may be incrementally scaled from a first port count, e.g., two thousand simplex ports, to second and higher port count, e.g., six thousand simplex ports, over a period of time. In other words, the slow, robotic switch may be scaled up and built in a distributed manner. Further, variable optical attenuation (VOA) and power monitoring options may be built-in to a slow optical switch, however, the slow optical switch does not require optical feedback to function. The cost per port of a slow optical switch is less than that of a fast optical switch, e.g., less than half in some instances, and a slow optical switch does not require power to maintain a cross-connection state. A slow optical switch requires power to operate, e.g., switch connections via the robotic mechanism, but may passively hold a current connection state. Optical cross-connect services using slow optical switches are typically used for cross-connections within a data center or a cluster of data centers located close to each other, e.g., within the same campus or regional area such as a metropolitan area.

Direct, dedicated, carrier-grade network links between customers may be spread over a wide geographical area and transport data using dense wavelength division multiplexing (DWDM) optical transponders, and may include multiple types or classes of transport services with different levels of reliability and availability. For example, transport services may include unprotected services, protected services, and dual diverse services. Service provisioning, grooming, protection, and restoration using optical switches may be automated, which may require switch response time to be fast to meet requirements for fault mitigation or restoration, and individual switch reconfiguration times may also be required to be fast. These types of services may operate across multiple data center locations in data centers across multiple sites in a metropolitan or regional optical network. In other words, provisioning and automation services between data centers in a larger metro or regional grouping may require a fast optical switch, e.g., with response times less than 1000 ms.

Current cross-connection architectures for optical switching and restoration rely on an optical network comprising fast optical switches to reroute and/or protect services in the event of a failure in the optical network, e.g., fiber cut, common equipment failure, e.g., power sources, or transmission equipment failure, e.g., sources and receivers. Optical switching and/or restoration may require fast optical switches with response times of less than 1000 ms. In some instances, optical protection such as one-to-one switching, one-to-N switching, and the like, may require switching times of less than 10 ms. In some instances, individual switch events of fast, N×N optical switches may have response times on the order of milliseconds and a full reconfiguration response time of less than 100 ms, or less than 10 ms. The fast optical switching times are required to prevent higher layers in the stack, such as higher L3-L7 Open Systems Interconnection (OSI) layers, from detecting a fault condition and triggering corrective action. Further, fast optical switching times may be required to minimize network connection outage time (e.g., so as to satisfy quality of service (QoS) requirements), and save cost, space and power by reducing the need for redundant and expensive transmission equipment.

For example, client signals may originate from different client platforms and be received at an optical network from various sources, e.g., routers, other switches, data center interconnects (DCIs), and the like. The optical network may receive client traffic at 10 G, 100 G, 400 G, or other rates. The incoming client traffic may also have different service classes and QoS requirements, such as unprotected, protected, or dual diverse. The number of clients the optical network may service may range from up to a thousand (at 100 G speeds) to a few thousand (e.g., at 10 G speeds). An optical network of N×N optical switches may switch an incoming client signal to any of the DCI ports, and the DCI ports may adapt/map the client signal to a DWDM signal. The DWDM signal may then be transported through the line system to another node in another data center or location. A network/domain controller may provide signaling and control functions that allow the system (e.g., including the fast-switching optical network) to perform functions such as service agnostic allocation of DCI and DWDM channels, service management across multiple optical and disparate networks, disaggregation of optical networks, failure detection and mitigation by re-routing client signals from paths having failed elements to other working paths in the network, using reserve capacity (e.g., ports, switches) to improve network reliability and availability, network optimization and defragmentation, and zero-touch automated provisioning and reconfiguration of client paths.

Examples of current fast optical switches and optical switching technologies include beam steering technologies such as electro-optic, acousto-optic, magneto-optic, thermo-optic, or micro-electromechanical technologies. Fast optical switches may be configured to perform multiple cross-connections simultaneously and may have switch response times of less than 10 ms, or less than 1 ms, and complete reconfigurability in less than 100 ms, or less than 50 ms. VOA and power monitoring options may be built-in to a fast optical switch. The fast optical switching response times enable a fast optical switch to provide layer 0 and layer 1 protections and/or restoration services that can pre-empt connection failure detection and/or corrective actions at higher layers. The fast optical switching response times may also enable network flexibility and reconfigurability, e.g., via reconfiguring router/transponder ports in response to time-dependent variations in network demands or to reduce outage time during a failure at some other portion of the network. Current fast optical switches are limited to 1,200 simplex ports or fewer.

However, current fast optical switching technologies are limited by switch density and/or port count size, high cost per port, and the fast optical switches themselves are a single point of failure that require redundancy and/or other expensive mechanisms to improve reliability. Also, the cost of scaling current fast optical switching technologies to higher switch densities increases exponentially, to the extent that scaling is possible. Further, current fast optical switch technologies typically do not maintain current optical interconnections in the event of a power failure, e.g., as opposed to certain slow optical switches. The inability of fast optical switches to passively (e.g., without power) maintain current optical interconnections imposes additional requirements on power supplies, e.g., a need for power supply redundancy and a need for an integrated external battery backup in the event of power failure.

For example, any failure in the optical mechanism of current fast optical switches require a complete replacement of the fast optical switch and essentially a full disconnection and reconnection of all the ports to a new fast optical switch. Replacement of the failed fast optical switch is manual and may take many hours. While the fast optical switch may itself have a very high reliability, a fast optical switch failure may result in service failures for long periods of time. Therefore, redundant fast optical switches may be deployed at every site with half the services configured through one switch and other half through the other switch. All protected services require the same level of reliability and a redundant pair of client signals.

Further, since current fast optical switches cannot be removed once in service without impacting availability, the largest possible switch must be deployed to maximize the ability to operate on all channels. In other words, the largest possible switch size must be deployed on "day 1." As such, all classes of services, including unprotected and protected services, need to be added through the fast optical switch to be able to optimize the complete traffic. This increases the unit costs for all service classes. Additionally, it is difficult or impossible to take advantage of future technology improvements in fast optical switching technologies, e.g., speed, size, etc., or to take advantage of a "pay as you grow" model (e.g., via incremental additions to the port count as opposed to complete replacement with a larger switch) without downtime or affecting services.

The present disclosure describes techniques for network switching and network switches including an optical switch that integrates a fast optical switch into a high port count mechanical optical switch (hereinafter described as "slow optical switch" or "slow switch fabric", in the alternative). The slow switch fabric and one or more fast optical switches may be combined in a single chassis for the optical switch.

In some examples, the techniques described herein may be configured to leverage a large port count optical cross-connect mesh fabric, e.g., a robotic patch panel, and provide protection and restoration services within the slower and larger automated robotic patch panel using integrated fast optical switches. The techniques described herein may combine the advantages of a slow optical network such as is used to connect services within or between data centers with the advantages of fast optical switches such as those used to provide provisioning and automation services between data centers in a larger metro or regional grouping. For example, the techniques may provide the large scale and low cost of the automated optical patch panels used in data centers to provision and manage cross-connect services, while allowing a fast optical switch to operate on a subset of channels/connections to provide high availability services. In some examples, the techniques may reduce and/or eliminate tradeoffs of utilizing a fast optical switch technology versus a slow optical switch technology, e.g., via offsetting the limitations of each technology with the other's benefits as described below.

In some examples, the techniques described herein may enable configuration and reconfiguration of all services provided by the mesh fabric to be slow and sequential while still providing fast interconnections speeds, e.g., while still providing protection and restoration functions. A fast optical switch coupled to a slow optical switch within an optical switch may improve the scalability of a switch fabric. In some examples, not all services in an optical network require fast optical switching response times. Encapsulating fast optical switches within a slow optical switch, e.g., integrating fast optical switches within a cross-connect fabric, enables grouping of optical interconnections, e.g., based on speed, protection, etc., which enables autonomous and/or remote control of provisioning and/or reprovisioning optical interconnects between fast and slow services, as opposed to fast and slow optical switches being used in parallel and/or in series.

For example, the techniques may enable scaling of the number and/or density of ports of the fast and slow optical switches to be based on group size and at a lower cost. If the demand for fast optical switching speeds increases, the slow optical switch may be scaled and another fast optical switch may be used to augment the larger slow optical switch at an overall reduced cost compared with scaling the fast optical switch, e.g., even if the slow optical switch would not need to be scaled to accommodate a scaled-up (and more expensive) fast optical switch.

In some examples, the techniques may improve scalability and cost of a switch fabric by reducing the number of redundant optical interconnections through the fast optical switch needed for protection, e.g., opening up those ports for other optical interconnections. For example, redundant optical interconnection paths for the fast optical switch may be re-routed around a failed fast optical switch through the slow optical switch.

Additionally, in some examples, the techniques may reduce complexity and cost of a mesh fabric by enabling measuring and/or monitoring of both the fast optical switches and the slow optical switch via resources hosted by the slow optical switch, e.g., OTDR measurement, OPM monitoring, BER monitoring, and the like. For example, slow optical switch ports may be used for monitoring and diagnostics opening up fast optical switch ports that would otherwise be used for monitoring and diagnostics.

Techniques disclosed herein may include a network and a programmable network platform that performs operations of a resource switch controller to assign ports and cross-connects on the mesh fabric including an optical network device having a fast optical switch to augment a slow optical switch to form an optical sub-network, assign network resources including the fast-optical switch that are connected to the optical mesh fabric, automate network services including provisioning, troubleshooting and reconfiguration, and arbitrate services within a data center, between data centers, or between multiple locations including multiple data centers. For example, the switch controller may be configured to assign ports on the slow optical switch and the fast optical switch to form an optical sub-network including at least one optical cross connection configured to be switched by the fast optical switch, and the network switch controller may be configured to reassign at least one optical cross connection of the sub-network to at least one redundant optical cross connection that bypasses the fast optical switch. The optical sub-network may be used to provide optical protection against failure of network elements or failure of optical fibers, e.g., by providing head-end and tail-end switching, to automate setup and troubleshooting of network components and sub-systems, and to provide dynamic reconfiguration and allocation of network resources.

FIG. 1 is a block diagram illustrating an example interconnection system that incorporates an optical switch having a slow optical switch and an integrated fast optical switch, in accordance with one or more techniques of the disclosure. Interconnection system 2 depicts interconnection facilities 8A-8B (collectively, "interconnection facilities 8") operated by an interconnection system provider, the interconnection facilities 8 connected by an optical network 10 configurable for cross-connecting customer networks 6A-6B (collectively, "customer networks 6"). In some instances, each of customer networks 6 may be associated with a different customer of the interconnection system provider. In some instances, customer networks 6 are both associated with a single customer of the interconnection system provider. As used herein, the term "customer" of the interconnection system provider may refer to a tenant of an interconnection facility 8 deployed by the interconnection system provider, whereby the customer leases space within the interconnection facility 8 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity.

Each of interconnection facilities 8 may represent different data centers geographically located within different metropolitan areas to provide resilient and independent interconnection services exchange by which customers of one metropolitan area and customers of a different metropolitan area may connect to receive and provide, respectively, services.

In each of the interconnection facilities 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the same interconnection facility 8 and/or to other customer(s) co-located in another interconnection facility 8.

Optical network 10 (including optical switch(es) 12) represents optical and photonic switching infrastructure that is configured by programmable network platform 3 to create a fiber cross-connect 7 that connects customer network 6A and customer network 6B co-located in interconnection facilities 8A and 8B, respectively. Optical network 10 may include pre-installed optical fiber between customer networks 6 and at least one distribution facility (or "distribution frame") of the interconnection facilities 8 and may further include pre-installed optical fiber between multiple distribution facilities of the interconnection facilities 8. Optical network 10 may further includes programmable photonic switches located within distribution facilities of the interconnection facilities 8 and/or located at the demarcation of customer space located in interconnection facilities 8. While described herein dynamically configurable, much of optical network 10 may be statically configured by a network operator associated with the interconnection facility provider, a network service provider that manages aspects of optical network, or other entity.

Optical network 10 may include one or more optical network devices 4 such as DCI transponders, muxponders, optical transceivers, channel multiplexors/demultiplexers, amplifiers, and/or optical switches, such as a wavelength selective switches (WSS), photonic cross-connect (PXC), optical cross-connect (OXC), optoelectronic based switch (OEO), or other types of devices that switch optical signals. An optical switch may route optical signals (light beams or lambdas) between optical fibers coupled to the optical switch.

System 2 further includes a programmable network platform (PNP) 3, alternatively referred to herein as an "interconnection platform." Programmable network platform 3 may expose a software interface that defines the methods, fields, and/or other software primitives by which application(s) 15 may invoke PNP 3 to dynamically provision a fiber cross-connect 7 between customer networks 6A, 6B. In this way, PNP 3 allows customers, carriers, network service providers (NSPs), and/or the interconnection system provider itself with the programmatic capability of configuring optical network 10 to interconnect customer network 6A to customer network 6B with fiber cross-connect 7.

Programmable network platform 3 may represent an application executing within one or more data centers of system 2 or alternatively, off-site/remotely at a back office or branch of the interconnection system 2 provider, for instance. Programmable network platform 3 may be distributed in whole or in part among the interconnection facilities. As illustrated in FIG. 1, programmable network platform 3 may control service provisioning for multiple different interconnection facilities. Alternatively, or additionally, multiple separate instances of the programmable network platform 3 may control service provisioning for respective multiple different interconnection facilities.

Application(s) 15 represents at least one application that communicates with PNP 3 to request and dynamically provision an interconnection between interconnection facilities 8 of customer networks 6A, 6B. Application(s) 15 represent client-side software for interfacing with PNP 3 and may include a customer portal, customer applications, an interconnection system 2 provider application that is accessible only to operators of interconnection facilities 8, a console such as a command-line interface or graphical user interface. Users or clients of application(s) 15 may include enterprise customers, cloud service and content providers, carriers, network service providers (NSPs), and/or the interconnection system provider itself, for instance.

An application of application(s) 15 may issue, to PNP 3, an interconnection request 11 that specifies parameters for interconnecting between interconnection facilities 8 of customer networks 6A and 6B. In response to receiving interconnection request 11, PNP 3 determines a path for the interconnection, e.g., an optical path through optical network 10, and dynamically provisions a path for the interconnection with fiber cross-connect 7 in optical network 10 to provide fiber-based interconnection between customer networks 6A, 6B to satisfy the interconnection request 11. Example parameters for interconnection request 11 may include requested bandwidth, type of service (e.g., protected, unprotected, dual diverse, etc.), port identifiers, and the like.

PNP 3 configures elements of optical network 10 by issuing configuration commands either directly to elements within optical network 10 by way of configuration interfaces of the elements, or indirectly to such elements via software-defined networking (SDN) controllers, e.g., an SDN controller, that manage the elements on behalf of the PNP 3. PNP 3 may in some instances be alternatively referred to as an orchestrator in that PNP 3 orchestrates one or more SDN controllers to configure optical network devices 4 (e.g., photonic switches) and/or other elements of optical network 10 to establish fiber cross-connect 7.

Programmable network platform 3 configures optical network devices 4 to switch optical signals along optical paths, each optical path beginning at an optical transmitter and terminating at an optical receiver and each of the optical transmitter and optical receiver being associated with one of customer networks 6. In this way, customer networks 6 may exchange frames and packets for L0/L1/L2/L3 services via dynamically provisioned fiber cross-connects. An optical path may alternatively be referred to as an optical path, a light path, a lambda or an optical transport network wavelength, or a composite DWDM optical signal. Example bandwidths for an optical path for a cross-connect may include, e.g., 2.5 Gbps, 10 Gbps, 40 Gbps, 100 Gbps, 400 Gbps, or even multi-terabit DWDM optical signals. An optical fiber may include multiple optical paths, i.e., the optical fiber may transport optical signals for multiple optical paths as different lambdas, for instance. Optoelectronic-based switches may limit switching applications according to the data rate, protocol, and format supported by the electronic components of switches.

Fiber cross-connect 7 may represent a Layer 0 ("L0") connection in that the fiber cross-connect underlies the Open Systems Interconnection (OSI) model or TCP/IP model for packet networking. In particular, fiber cross-connect 7 may underlie an optical transport network (OTN) layer that (typically in conjunction with a SONET/SDH layer) provides Layer 1 ("L1") connectivity between optical network devices 4 such as wavelength division multiplexing (WDM) devices. For instance, fiber cross-connect 7 may represent one or more wavelengths (or "lambdas") photonically switched by elements of optical switch fabric to provide an optical path (or "light path") for optical signals exchanged between customer networks 6A, 6B associated with different customers/tenants of the interconnection system 2 provider. In this way, optical network 10 is configured to provide non-blocking switching by way of a high-speed fiber connection between respective customers networks 6A, 6B for the customers of the interconnection system 2 provider and, in doing so, may provide reliable and low-latency communication between customer networks 6A, 6B.

Customer networks 6A, 6B use respective access links 9A, 9B to access fiber cross-connect 7 to exchange data. Access links 9A, 9B may represent, in some instances, grey links/optics, in which a router or switch of customer networks 6A, 6B exchanges grey (uncolored) optical signals with a coherent optical device that converts between a grey optical signal and an optical signal at a specific wavelength (color) exchanged with an optical network device of optical network 10. In some examples, a pluggable coherent optical device may be directly integrated to an optical network device (e.g., panel of the optical network device), which eliminates the need for short-reach optical pluggable module.

Fiber cross-connect 7 may in some cases underlie a layer 2 ("L2") or layer 3 ("L3") service provided by the interconnection system 2 provider to interconnect customer networks 6A, 6B according to an L2 or L3 service. For example, interconnection facility 8 may operate a network services exchange, such as Ethernet Exchange, and Internet Exchange, and/or a Cloud Exchange, and each of these may make use of dynamically provisioned fiber cross-connect 7 to transmit L2/L3 packet data between customer networks 6A, 6B.

In accordance with techniques described in this disclosure, optical network 10 includes at least one optical switch 12. Optical switch 12 includes a fast optical switch and a cross-connect fabric (or "slow optical switch"). The fast optical switch may be integrated within the slow optical switch to form the optical switch 12. Optical switch 12 may be programmable and located within distribution facilities of interconnection facilities 8A and/or 8B. In some examples, the slow optical switch of optical switch 12 may include a robotic mechanism to switch a connection state of a connection port, and a fast optical switch of optical switch 12 may be integrated within the slow optical switch and may include a switching time that is less than 1000 milliseconds. The fast optical switch of optical switch 12 may have one or more input ports connected to one or more output ports of the slow switch fabric, and the fast optical switch may have one or more output ports connected to one or more input ports of the slow switch fabric. Optical switch 12 may represent an optical patch panel switch for a patch panel of a customer cage that hosts customer network 6A within interconnection facility 8A.

As a result of provisioning a fiber cross-connect 7 between interconnection facilities 8A and 8B via optical switch 12, the techniques may provide a large port count optical cross-connect mesh fabric, e.g., a robotic patch panel, in combination with protection and restoration services that augment the slower and larger automated optical cross-connect mesh fabric using integrated fast optical switches. Additionally, optical network 10 including optical switch 12 may provide scaling of the number and/or density of ports of the fast and slow optical switches to be based on a group size, reduce the number of redundant optical interconnections through the fast optical switch, and enable measurement and/or monitoring of both the fast optical switches and the slow optical switch via resources hosted by the slow optical switch, e.g., OTDR measurement, OPM monitoring, BER monitoring, and the like. Additional details of optical cross-connects are found in U.S. patent application Ser. No. 14/937,787, filed Nov. 10, 2015, which is incorporated by reference herein in its entirety.

Figure 2A:
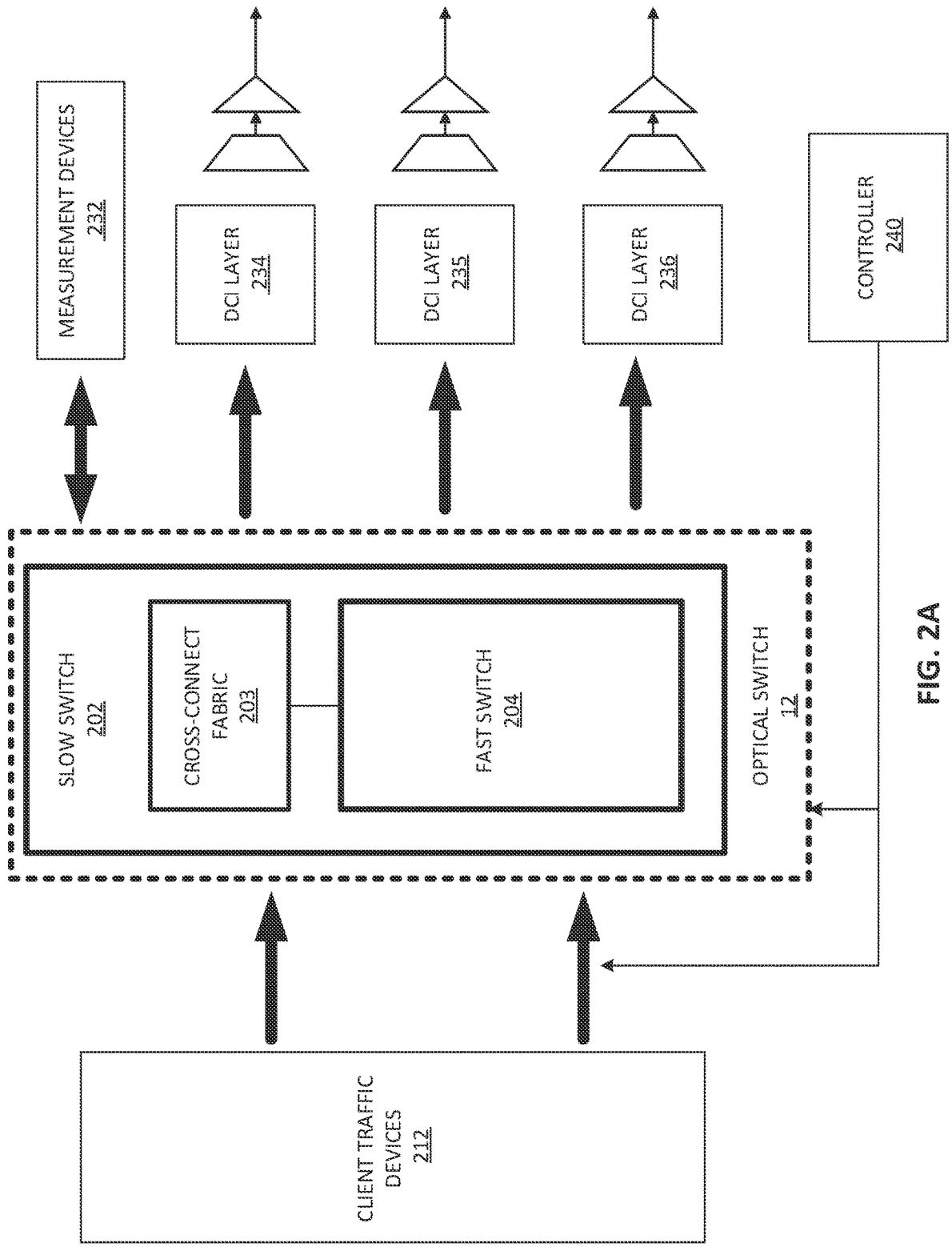
FIG. 2A is a block diagram illustrating an example switch including a fast optical switch and a slow optical switch, in accordance with one or more techniques of the disclosure.

FIG. 2A a block diagram illustrating an example optical switch 12 including a fast optical switch 204 and a slow optical switch 202, in accordance with one or more techniques of the disclosure. Fast optical switch 204 may be integrated and/or encapsulated within slow optical switch 202 by virtue of an input port of fast optical switch 204 being connected to an output port of cross-connect fabric 203 and multiple output ports of fast optical switch 204 being connected to different input ports of cross-connect fabric 203 or different output ports of optical switch 12. At least some outputs of cross-connect fabric 203 are connected to output ports of optical switch 12. At least some inputs cross-connect fabric 203 are connected to input ports of optical switch 12. In some examples, an optical interconnect facilitated by optical switch 12 may include a path through slow optical switch 202 that bypasses fast optical switch 204, but an optical interconnect including a path through fast optical switch 204 cannot bypass slow optical switch 202.

Client traffic devices 212 may include customer client routers, switches, WDM plugs, and/or any suitable devices for sending and/or receiving client optical network traffic. Client traffic devices 212 are communicatively coupled to optical switch 12 and configured to send and receive network traffic via optical switch 12. In some examples, client traffic devices 212 may be connected to each other and/or DCI layers 234-236 via an optical switch fabric including optical switch 12, e.g., such as optical network 10 described above. In the example shown, all client traffic devices 12 are communicatively coupled directly to optical switch 12, and more particularly to slow optical switch 202. In some examples, a portion of client network traffic optical data paths routed through optical switch 12 include just slow optical switch 202, and a portion of client network traffic optical data paths routed through optical switch 12 include both slow optical switch 202 and fast optical switch 204. Client traffic may in 10 G, 100 G, 400 G, or any suitable network traffic speed, and the number of client services/devices of client traffic devices supported and/or routable through optical switch 12 may be in the hundreds and/or thousands (e.g., at higher speeds such as 100 G, 400 G, and the like), and/or thousands or tens of thousands (e.g., at slower speeds such as 10 G, 100 G, and the like).

Slow optical switch 202 may be substantially similar to slow optical switches described herein, e.g., as described above with reference to FIG. 1. Slow optical switch 202 may be an optical patch panel automated via a robotic mechanism to configure or reconfigure the patch panel sequentially or a few ports at a time. In some examples, slow optical switch 202 may be configured to switch a network connection, e.g., switch between ports, with a switching time per port of greater than one second. Slow optical switch 202 may be scalable to large port counts, e.g., thousands of ports, tens of thousands of port, or more. Slow optical switch 202 may be incrementally scaled from a first port count to second, and higher port count, over a period of time. In some examples, power monitoring and VOA options may be built-in to slow optical switch 202. Slow optical switch 202 may not require optical feedback to function, and may not require power to maintain a cross-connection state. Slow optical switch 202 may require power to operate, e.g., switch connections via the robotic mechanism, but may passively hold a current connection state. For example, slow optical switch 202 may be configured to hold an interconnection state and/or configuration during a power cycle and/or a switch malfunction. In some examples, switch parts and/or hardware (e.g., including robotic arms) may be modular and may be configured to be replaceable in the field, e.g., without disruption a portion of, or any of the network traffic routed through slow optical switch 202. In some examples, optical switch 12, slow optical switch 202, and/or controller 240 may be configured to capture a switch state and/or configuration, e.g., in a database or a redundant database. Optical switch 12, slow optical switch 202, and/or controller 240 may be configured to then recover a switch state and/or configuration based on a captured switch state and/or configuration, e.g., after a fault, failure, or other condition requiring a reset of a portion or all of optical switch 12 and/or slow optical switch 202.

In some examples, slow optical switch 202 may be configured to provide a mechanism to operate on all network traffic routed through optical switch 12. In some examples, slow optical switch 202 may be a single switch, and in other examples slow optical switch 202 may comprise a plurality of distributed slow optical switches with interconnections between them. In some examples, the per port cost of slow optical switch 202 may be less than the per port cost of fast optical switch 204.

Fast optical switch 204 may be substantially similar to fast optical switches described herein, e.g., as described above with reference to FIG. 1. Fast optical switch 204 may be integrated within slow optical switch 202, e.g., each input port of fast optical switch 204 be connected to at least one output port of slow optical switch 202, and each output port of fast optical switch 204 may be connected to at least one input port of slow optical switch 202. Fast optical switch 204 may include a switching time that is less than 1000 ms. Fast optical switch 204 may include any suitable fast optical switching technology and/or fast beam steering technology such as electro-optic, acousto-optic, magneto-optic, thermo-optic, or micro-electro mechanical beam steering. Fast optical switch 204 may be configured to perform multiple cross-connections simultaneously, and may have switch response times of less than 10 ms, or less than 1 ms, and complete reconfigurability in less than 100 ms, or less than 50 ms. VOA and power monitoring options may be built-in to fast optical switch 204. Fast optical switch 204 may have response times enabling fast optical switch 204 to provide layer 0 and layer 1 protections and/or restoration services that can pre-empt connection failure detection and/or corrective actions at higher layers. Fast optical switch 204 may have response times enabling network flexibility and reconfigurability, e.g., via reconfiguring router/transponder ports in response to time-dependent variations in network demands or to reduce outage time during a failure at some other portion of the network.

In some examples, fast optical switch 204 may comprise a single fast optical switch, and in other examples fast optical switch 204 may comprise a plurality of fast optical switches, e.g., a plurality of smaller port-count fast optical switches. Fast optical switch 204 may have any suitable number of ports, however, fast optical switch 204 may have a relatively smaller number of ports, e.g., 1,200 ports or less. For example, optical switch 12 may be scalable and may be configured to increase the number of ports supporting fast optical switching by increasing the number of fast optical switches 204 integrated within slow optical switch 202 rather than encapsulating and/or integrating a larger port-count fast optical switch. For example, the per-port cost of fast optical switches may increase nonlinearly, e.g., exponentially, with port count, and fast optical switch 204 may be configured to have a relatively smaller port count to allow optical switch 12 to increase the fast optical switching capacity via an increase in the number of smaller, lower cost fast optical switches 204.

In some examples, the optical switch 12 may be configured to reduce the size and/or port count of fast optical switch 204, e.g., while providing an equivalent level of fast optical switching services. For example, optical switch 12 may utilize an M:N (where M is less than N) protection scheme where M ports are used to provide redundancy for N clients and the M+N ports are required to be on the same fast optical switch 204. In some examples, M+N is less than 12 or 24, and having multiple, smaller fast optical switches 204 integrated with slow switch 202 enables sparing fewer, and smaller, fast optical switches 204 for redundancy and enables hot sparing of fast optical switches 204.

In some examples, slow optical switch 202 may be a larger optical mesh fabric comprising an automated patch panel used to provide cross-connect services within a data center. Fast optical switch 204 may be used to provide protection and restoration services on a sub-set of services that originate or terminate at the data center. In the example shown, optical switch 12 is communicatively connected to a plurality of DCI layers, e.g., DCI layers 234-236. In some examples, optical switch 12 may be communicatively connected to more or fewer DCI layers, or the plurality of DCI layers may be configured and/or grouped as a single DCI layer for connection with optical switch 12. In some examples, DCI layer and/or WDM layer nodes and/or optical fibers may be part of a shared risk group. For example, DCI layer 234 may include a first shared risk group including a plurality of network traffic paths, e.g., a first plurality of nodes and optical fibers, and DCI layer 236 may include a second shared risk group including a plurality of network traffic paths, e.g., a second plurality of nodes and optical fibers different from the first plurality of nodes and optical fibers. The risk of network traffic disruption and time to restoration may be reduced via shared risk grouping.

DCI layers 234-236 may be configured to connected between data centers, e.g., to connect optical switch 12 to one or more devices located in a different data center and/or area from optical switch 12, such as in another room, another building, another city, another region, or any other suitable data center site separate from the data center within which optical switch 12 is housed. In some examples, optical switch 12 may be located in a single location, e.g., within a data center within a building. In other examples, optical switch 12 may be distributed across multiple locations, e.g., within a data center encompassing multiple buildings, or within a data center cluster.

In some examples, optical switch 12 may include measurement and/or monitoring services. In the example shown, optical switch 12 is communicatively connected to measurement devices 232. Measurement devices 232 may include power meters, OTDR, BER monitors, and the like. Switch 12 may be configured for quality of service measurements. For example, controller 240 may be configured to receive data and/or measurements from measurement devices 232 and determine quality of service parameters of switch 12.

In some examples, client network traffic from and/or to client traffic devices 212 may be routed through fast switch 204 via slow switch 202, or client network traffic from and/or to client traffic devices 212 may be rerouted just through slow switch 202. For example, optical switch 12 may be configured to support optical subnetworks configured to use fast optical switch 204 integrated within slow optical switch 202. In some examples, optical switch 12 is configured to provide all services through slow switch 202, only the ports and/or clients requiring fast optical switching services (e.g., optical protection services and the like) need to be a part of an optical subnetwork including fast optical switch 204. Network traffic services requiring fast switch functionality may be routed through fast optical switch 204, and network traffic services not requiring fast switch functionality may be routed through just slow optical switch 202. In some examples, one or more client network traffic routes may be re-routable through slow switch 202, e.g., for protection via redundancy. In other words, optical switch 12 may provide network traffic fast network interconnection protection via redundancy without requiring one or more redundant network traffic paths to be routed through a fast switch. For example, providing redundant network traffic paths for fast optical switch 204 through slow optical switch 202 may allow fast optical network switch 204 to be reset without disruption to fast optical services. In some examples, optical switch 12 may be configured to reduce reconfiguration time required to bypass a failed or faulty fast optical switch, e.g., from hours to minutes by providing redundant network traffic paths for fast optical switch 204 through slow optical switch 202

In some examples, optical switch 12 may enable seamless replacement and/or upgrading of fast optical switch 204, or enable seamless addition of other fast optical switches integrated within slow optical switch 202, e.g., additional fast optical switch network traffic routes may be added via additional fast optical switches without disrupting current network traffic routes through fast optical switch 204 and/or slow optical switch 202. In some examples, optical switch 12 may be configured to incorporate future technology improvements, e.g., future fast and/or slow optical networking technologies, without disrupting current network traffic.

In some examples, optical switch 12 may be configured to enable seamless service upgrades and downgrades. For example, controller 240 may be configured to upgrade selected network traffic to be routed through fast optical switch 204 from routes including just slow optical switch 202 without disruption to the selected network traffic and/or other network traffic. Conversely, controller 240 may be configured to downgrade selected network traffic to be routed through just slow optical switch 202 from routes including fast optical switch 204 without disruption to the selected network traffic and/or other network traffic.

In some examples, optical switch 12 may be configured to reduce port and switching costs. For example, optical switch 12 may be configured to provision unprotected traffic through slow optical switch 202 and bypass fast optical switch 202, optical switch 12 may be configured to reduce and/or eliminate fast optical switch 204 redundancy, e.g., redundancy may be provided by slow optical switch 202.

Optical switch 12 may be configured to allow multiple levels of protections, e.g., protected, unprotected, via reconfigurable redundancy, and optical switch 12 may be configured to increase optical mesh fabric efficiency by reducing redundancy required within fast optical switch 204 and thereby enabling all of the ports in the system to be addressable and reconfigurable.

Controller 240 is configured to operate over multiple nodes or domains. Controller 240 may be configured to integrate information from monitoring points, sensors, and switch ports, e.g., based on a fault condition. Controller 240 may be configured to assign ports and cross-connects on the mesh fabric, e.g., optical switch 12, to form an optical sub-network. Controller 240 may be configured to assign network resources, including slow optical switch 202 and/or fast optical switch 204, connected to the optical fabric, and automate network services including provisioning, troubleshooting and reconfiguration. Controller 240 may be configured to reassign at least one optical cross connection of the sub-network to at least one redundant optical cross connection that bypasses the fast optical switch 204. In some examples, controller 240 may be configured to arbitrate services in a data center, e.g., at a single location, multiple locations, and/or multiple locations distributed across a large geographic area. In some examples, controller 240 may be configured to form one or more optical sub-networks within the optical mesh including optical switch 12 that may enable optical protection against failure of network elements or fibers including features such as head end and tail end switching, automation of setup and troubleshooting of network components and sub-systems, dynamic reconfiguration and allocation of network resources, and the like. Controller 240 may represent a PNP 3 of FIG. 1 and/or one or more SDN controllers.

Figure 2B:
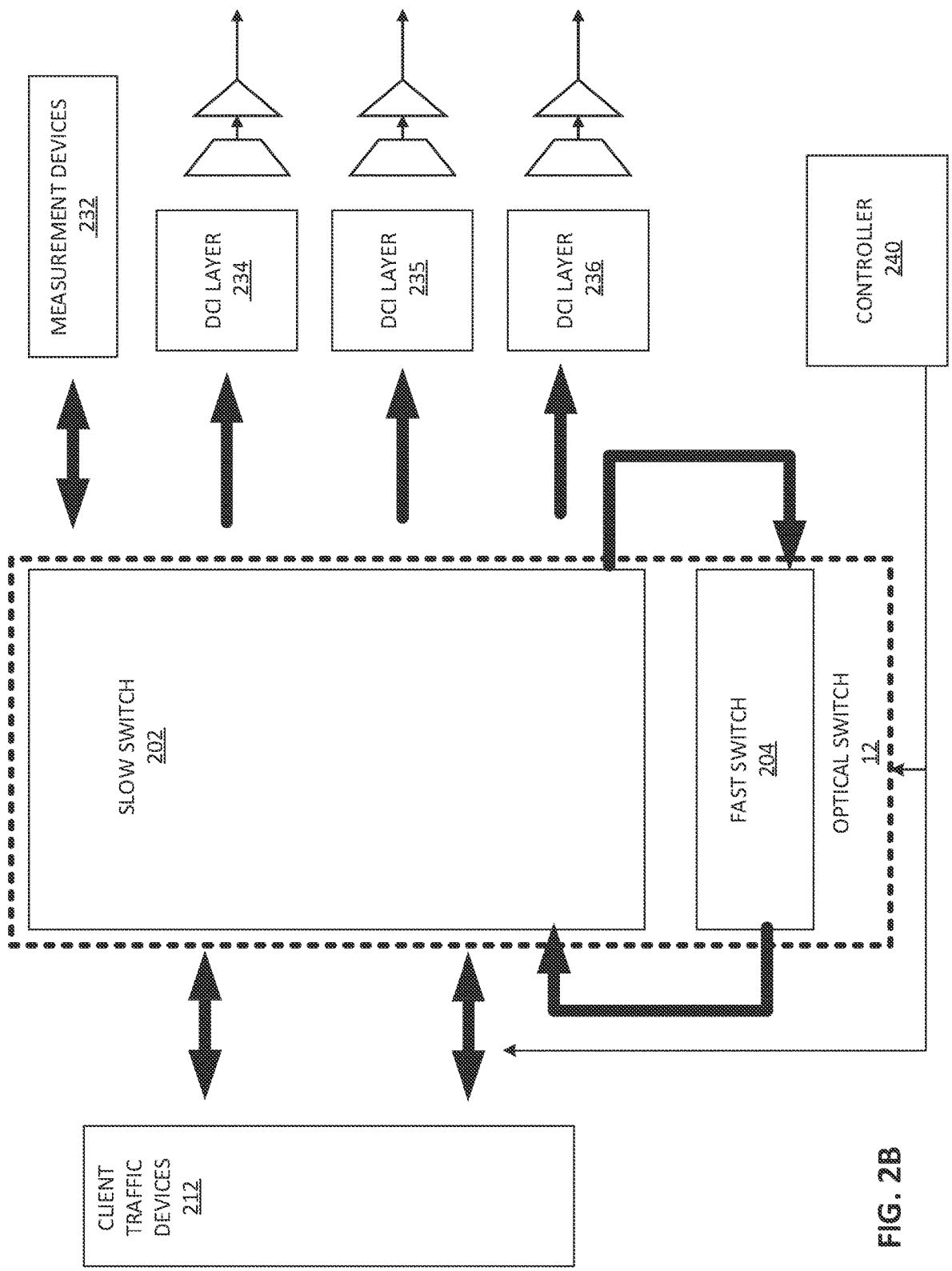
FIG. 2B is a block diagram illustrating an example switch including a fast optical switch and a slow optical switch, in accordance with one or more techniques of the disclosure.

FIG. 2B is a block diagram illustrating an example switch 12 including a fast optical switch 204 and a slow optical switch 202, in accordance with one or more techniques of the disclosure. The example switch 12 illustrated in FIG. 2B may be substantially similar to switch 12 of FIG. 2A with switch 12 of FIG. 2B illustrating an example of fast switch 204 physically integrated with slow switch 202, e.g., the physical mechanism and/or interconnections between output ports of slow switch 202 connected with input ports of fast switch 204 and output ports of fast switch 204 connected with input ports of slow switch 202.

Figure 3:
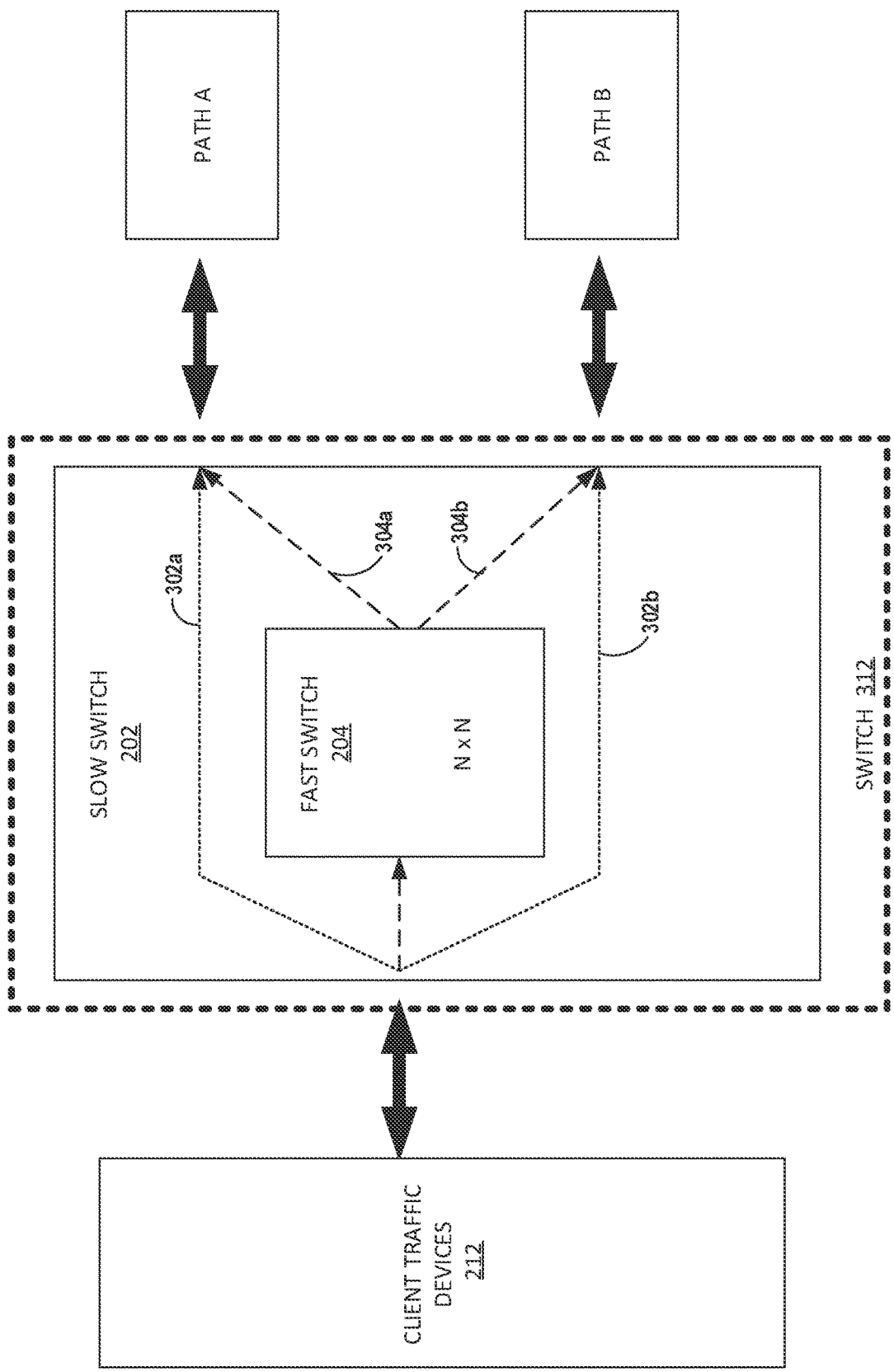
FIG. 3 is a block diagram illustrating another example switch including a fast optical switch and a slow optical switch as part of an optical network device, in accordance with one or more techniques of the disclosure.

FIG. 3 is a block diagram illustrating another example switch 312 including a fast optical switch 204 and a slow optical switch 202, in accordance with one or more techniques of the disclosure. Switch 312 may be similar to optical switch 12 described above, and illustrates multiple and redundant network traffic paths 302a, 302b, 304a, and 304b.

In the example shown, switch 312 is configured to provide network traffic routes 302a and 302b to connected between client traffic devices 212 and network paths A and B, which may be redundant with network traffic paths 304a and 304b providing fast optical switching between client traffic devices 212 and paths A and B. For examples, slow (e.g., robotic) optical switch 202 may be configured to bypass fast optical switch 204 completely via network traffic routes 302a and 302b to provide optical network traffic connectivity while fast optical switch 204 may be replaced, reconfigured, and or reset. In some examples, slow optical switch 202 may also re-route network traffic to a different fast optical switch 204, e.g., an additional and separate backup fast optical switch 204 integrated within slow optical switch 202. In some examples, multiple client inputs not required in order to have fast optical switching protection services. In the example shown, routes A and B may be network traffic endpoints and/or nodes or intermediate points from which network traffic may be forwarded to an endpoint or branch out to multiple endpoints.

Figure 4:
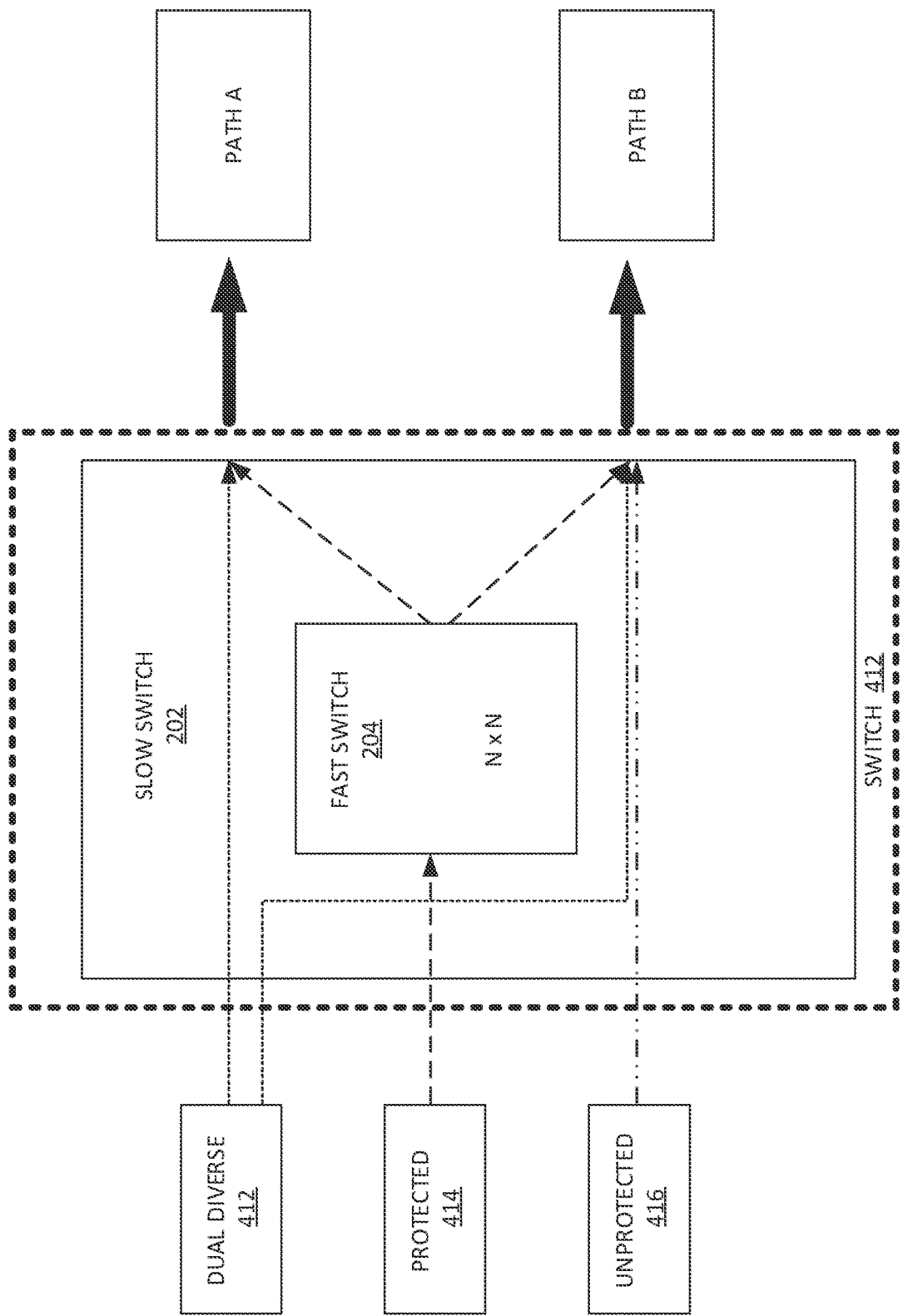
FIG. 4 is a block diagram illustrating an example protection scheme including a fast optical switch and a slow optical switch as part of an optical network device, in accordance with one or more techniques of the disclosure.

FIG. 4 is a block diagram illustrating an example protection scheme including a fast optical switch 204 and a slow optical switch 202, in accordance with one or more techniques of the disclosure. FIG. 4 illustrates protection schemes implemented with switch 412 including a single fast optical switch 204 integrated with slow switch 202. Switch 412 may be similar to optical switch 12 described above.

In the example shown, switch 412 may provide multiple network traffic protection types and/or levels, e.g., dual diverse 412 network traffic, protected 414 network traffic, and unprotected 416 network traffic. Dual diverse 412 network traffic and unprotected 416 network traffic may be configured to bypass fast optical switch 204. The size of fast optical switch 204 may be limited by only client signals that require fast protection or restoration services.

Switch 412 may be configured to provide protected transport services in the network. In a protected service, an optical network path may be switched based on the detection of either a path failure or a DCI failure. Switch 412 may be configured to provide improved QoS and availability of all services, e.g., by using existing available excess network resources in the network. In some examples, switch 412 may be configured to share excess capacity among all the services, which may reduce the cost to offer such services.

Switch 412 may be configured to implement protect and self-healing mechanisms. For example, switch 412 may include protection against client plug, module, or shelf failure. Switch 412 may be configured to use protection schemes with additional network resources such as DCI modules, channels, and the like. Switch 412 may be configured to implement shared redundancy such as M:N (N>M) redundancy, which may reduce the cost of protection while improving availability.

In addition to protection against node or equipment failure, switch 412 may be configured for protection against fiber cuts and node failure. For example, switch 412 may be configured for a 1:1 channel redundancy and separate node degrees and fiber paths from the node. In a mesh network, fiber cuts may have different effects on different paths, and switch 412 may be configured to implement more complicated protection and restoration scenarios. Switch 412 may be configured to route and/or re-route network traffic during maintenance, upgrades, and the like, thereby reducing network traffic outages and switch downtime.

In some examples, switch 412 may include an Optical Protection Switch (OPS), e.g., a 1×2 switch. For example, switch 412 may be configured with an OPS switching based on tail end detection, and may be configured for switching times of less than 50 ms. In some examples, switch 412 may include ganged OPS, or a subset of a larger N×N fast optical switch with fast switching logic built into switch hardware and/or software. In some examples, switch 412 may be configured to bypass the OPS, e.g., in case of switch failure, and switch 412 may be configured to re-route traffic during maintenance, upgrades, and the like, e.g., to reduce and/or minimize traffic outages and/or downtime.

Figure 5:
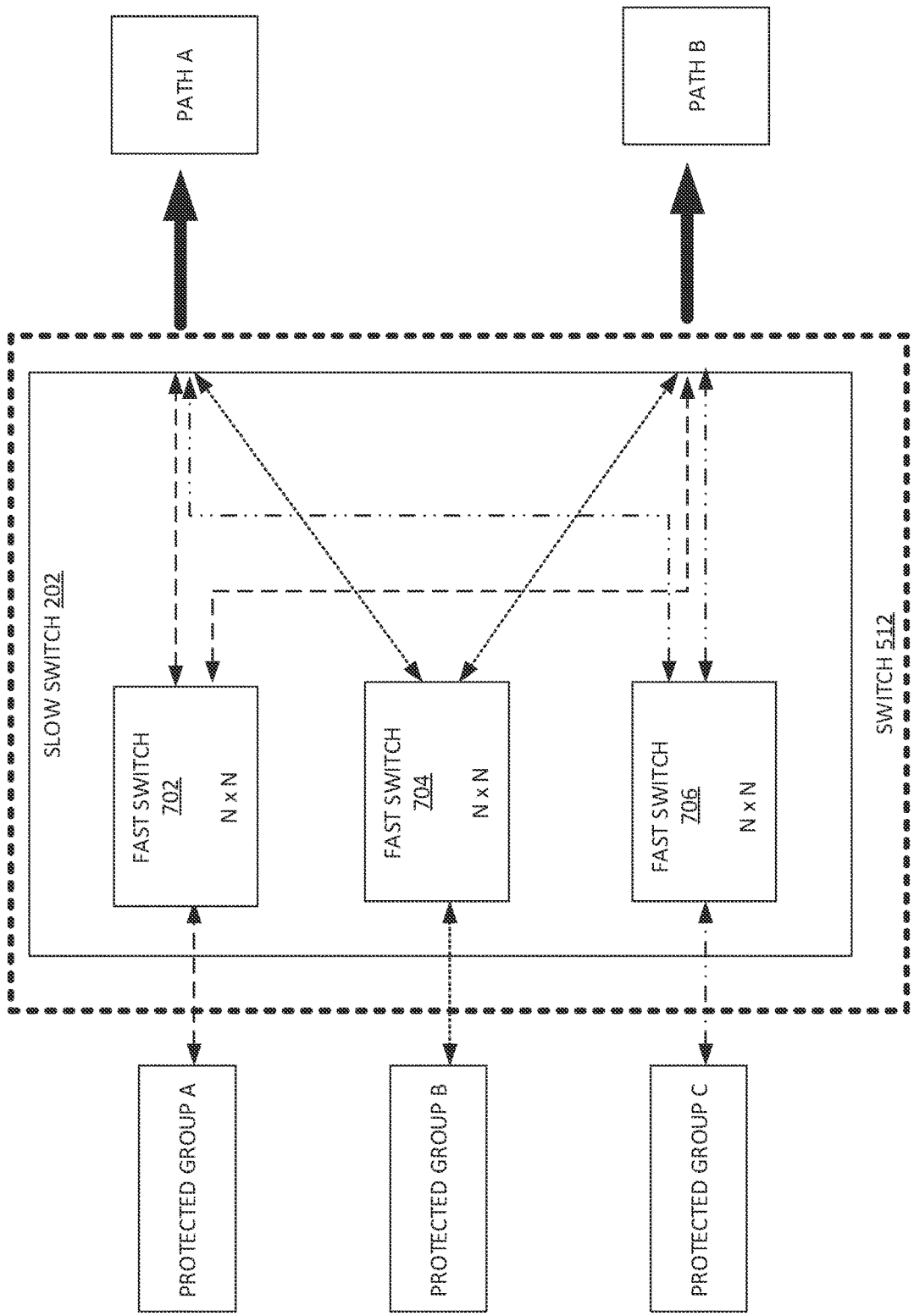
FIG. 5 is a block diagram illustrating another example protection scheme including a plurality of fast optical switches and a slow optical switch as part of an optical switch, in accordance with one or more techniques of the disclosure.

FIG. 5 is a block diagram illustrating an example protection scheme including a plurality of fast optical switches 702-706 and a slow optical switch 202 for an optical switch 512, in accordance with one or more techniques of the disclosure. FIG. 5 illustrates protection schemes implemented with switch 512. Switch 512 may be substantially similar to optical switch 12 and/or switch 412 described above.

In the example shown, switch 512 may provide dynamic scalability for the optical mesh fabric and multiple protection types and/or levels. In the example shown, each protected group A-C may have the same or different protection types and/or levels. Clients using common protection resources are routed through the same fast optical switch, e.g., all clients utilizing protection resources grouped into protected group A are routed through fast optical switch 702, all clients utilizing protection resources grouped into protected group B are routed through fast optical switch 704, and all clients utilizing protection resources grouped into protected group C are routed through fast optical switch 706. In the example shown, the channels that are part of the protected groupings A-C are reconfigurable because they all flow through slow switch 202.

In the case of a fast switch failure all the channels in a group going through a fast switch can be reconfigured to go through a different or a backup switch. For example, protected group B may be routed through fast optical switch 702 or fast optical switch 706, e.g., in case of a failure with fast optical switch 704. In some examples, switch 512 is configured to enable all client ports of switch 512 to be reconfigurable.

For example, switch 512 may be configured to be reconfigurable to accommodate client port utilization, channel path requirements, changes in network traffic with time due to traffic churn and growth, changes in the relative mix of service types with time, and customer requested service interface changes, e.g., from 10 G to 400 G data rates via one or more communication protocols such as Ethernet, Fibre Channel (FC), Synchronous Optical Network (SONET), synchronous digital hierarchy (SDH), Optical Transport Network (OTN), and the like. 512 may be configured to upgrades services from unprotected to a protected, or to downgrade services from protected to unprotected, within minutes with minimal or no traffic disruption.

In some examples, switch 512 provides the benefit of routing all client traffic, including unprotected, protected, and dual diverse services, through the same switch fabric enabling switch 512 to reconfigure, rebalance, or re-groom ports without physical intervention. In some examples, switch 512 is configured to optimize the flow of all network traffic, including different network traffic protection types, e.g., via routing all traffic through the switch fabric. In some examples, switch 512 may be configured to reduce port under-utilization, e.g., due to network traffic churn and the need for physical intervention and the logistics of managing the different client port types.

Figure 6:
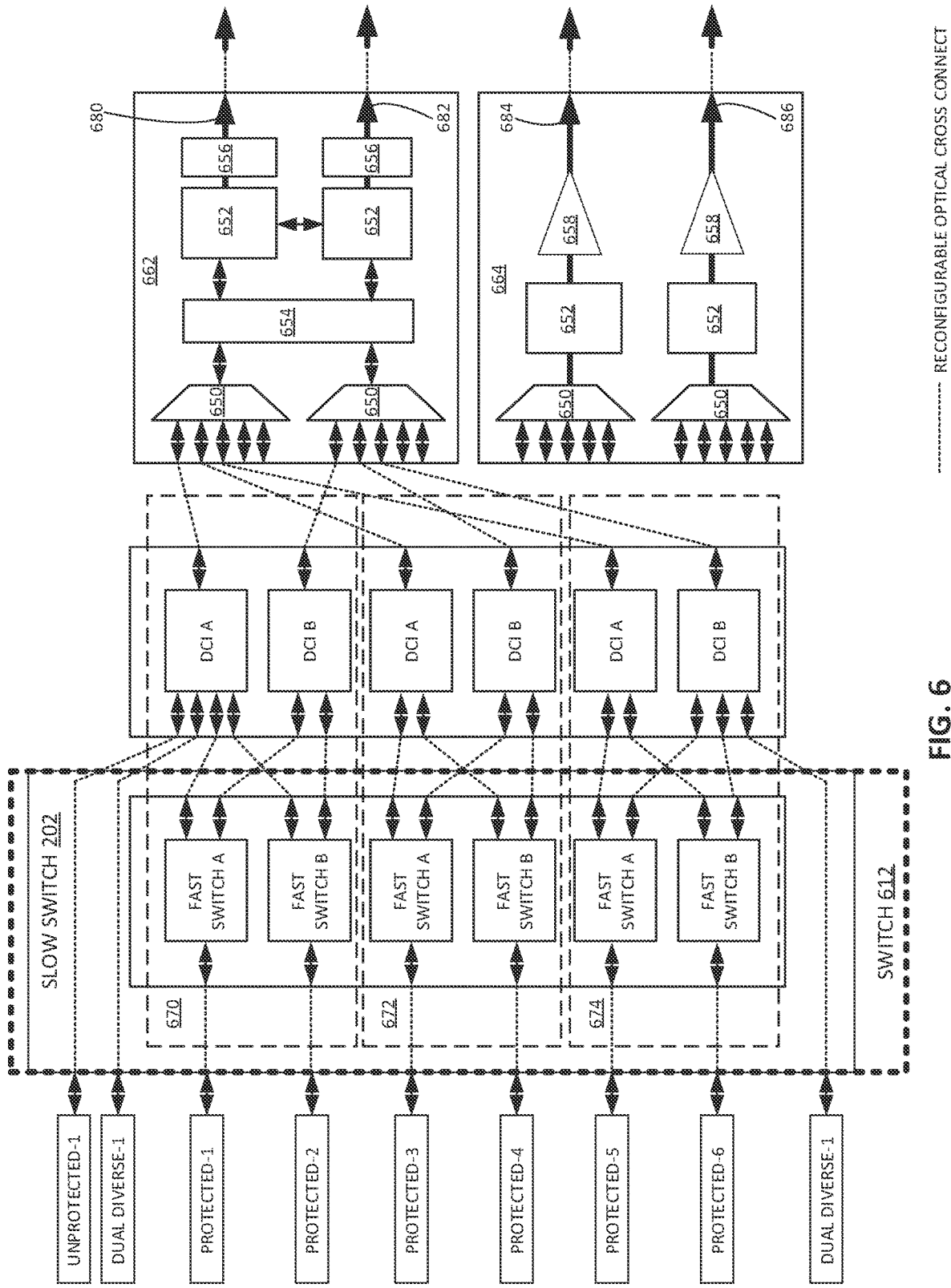
FIG. 6 is a block diagram illustrating an example protection scheme including a plurality of fast optical switches and a slow optical switch as part of an optical network device, in accordance with one or more techniques of the disclosure.

FIG. 6 is a block diagram illustrating an example protection scheme including a plurality of fast optical switches A-B integrated within a slow optical switch 202, in accordance with one or more techniques of the disclosure. FIG. 6 illustrates protection schemes implemented with switch 612. Switch 612 may be substantially similar to optical switch 12, switch 412, and/or switch 512 described above.

In the example shown, the protection scheme includes unprotected, dual diverse, and a plurality of protected services. In the example shown, there are two protection levels for three different speeds, resulting six protection groupings, e.g., protected groups 1-6. Although two protection levels and three speeds are shown, this is exemplary and the present disclosure contemplates fewer or more protection levels and/or speeds, e.g., one protection level or three or more protection levels and/or one or two speeds or four or more speeds.

In the example shown, client traffic having the first protection level is routed through fast switch A to DCI A, and client traffic having the second protection level is routed through fast switch B to DCI B. Client traffic having the first speed are routed through fast switch A ports and fast switch B ports illustrated as speed grouping 670, client traffic having the second speed are routed through fast switch A ports and fast switch B ports illustrated as speed grouping 672, and client traffic having the third speed are routed through fast switch A ports and fast switch B ports illustrated as speed grouping 676. In some examples, the first speed may be 100-800 G DWDM, the second speed may be 100-400 G DWDM, and the third speed may be 100-200 G DWDM, although the present disclosure contemplates any suitable speed for any of the first, second, and third speeds.

In the example shown, the dashed lines represent reconfigurable optical cross-connections routed through slow switch 202. For example, any of the protection groups 1-6, the dual diverse group, and/or the unprotected group may be rerouted via reconfiguration through slow optical switch, e.g., if a portion or all of fast switch A or fast switch B, or some other resource in the path through switch 612, may fail.

In the example shown, flex grid systems 662 and 664 are integrated within slow switch 202. In the example shown, within flex grid system 662, client traffic that was groomed and transposed on to a DWDM wavelength is multiplexed/demultiplexed using add/drop multiplexors/demultiplexors 650. The channels pass through fiber shuffle panel 654. The channel then passes through Reconfigurable Optical Add/Drop Multiplexers (ROADMs) 652 and amplifiers 656, e.g., erbium-doped Fiber Amplifiers (EDFAs) 656. In some examples, the channels then exit switch 612 as DWDM signal 680 having the first protection level and DWDM signal 682 having the second protection level. In some examples, DWDM signal 680 and/or DWDM signal 682 may enter into switch 612 and be redirected to a different path outside the physical fiber plant. DWDM signal 680 may be a working optical path, and DWDM signal 682 may be a diverse optical path. In some examples, multiplexors/demultiplexors 650 may be colorless, directionless, and/or contentionless (e.g., CD or CDC) filters.

In the example shown, within flexible grid ROADM system 664, client traffic may be multiplexed/demultiplexed using an optical array waveguide router (AWG) pass through ROADMs 652 and amplifiers 658. In some examples, the channels then exit switch 612 as DWDM signal 684 and DWDM signal 682, and DWDM signals 684 and 686 may be optical paths that are outside the physical fiber plant. In some examples, DWDM signal 684 and/or DWDM signal 686 may enter into switch 612 and be redirected to a different path outside the physical fiber plant.

In some examples, switch 612 may be configured to re-route clients from one channel to another, e.g., to improve and/or optimize line side traffic. For example, the client side maps to the line side (DWDM) side in an optical network, as shown. The line side (routing and channel assignment) may become sub-optimal over time due to traffic churn and variations in actual traffic growth from projected traffic growth. Switch 612 may be configured to provide load balancing through the network to relieve congestion on certain links, spectral optimization to relive spectral blocking in the network, a work around for a temporary outage, such as network upgrades, card swaps, and the like, to reduce and/or minimize outages. Switch 612 may be configured to support spectral re-assignment in an AWG based network, regeneration and/or wavelength translation, and partial add/drops.

In some examples, switch 612 may be configured to support dynamic and/or time-varying capacity assignment. For example, nodes/degrees may be provisioned for maximum total capacity, and switch 612 may be configured to enable a first client to sell capacity to a second client for short increments of time. Switch 612 may be configured to enable such a sale by identifying the network resources needed and completing the optical path. As such, switch 612 may be configured to support time varying demand on packet networks, where switch ports may be re-assigned to satisfy paths with high demand to improve latency and relieve congestion, as well as time dependent services such as backup, data migration, and the like.

In some examples, switch 612 may be configured to enable seamless network upgrades, additions, deletions, and expansions in a disaggregated network architecture. For example, switch 612 may be enable migration of controls from an optical network provider to the data center transport software defined network controller (T-SDN controller), e.g., to make the optical network more vendor agnostic. Switch 612 may be configured to reuse existing customer demarcation ports having an old service interface and automatically configure the port to carry a new service interface, e.g., from 10E to 16G GC or 10GRE to 400GE, or the like. Switch 612 may be configured to provide a quick turnaround service activation for on-demand service with various interfaces and protection types.

In some examples, switch 612 may be configured to detect faults in transmission and receiving equipment, e.g., transponder and layer 1/2/3 switches), line equipment (ROADM/AMP/Mux/Demux) and optical fibers and compute and re-route client signals from failed devices and paths to working devices and paths. Switch 612 may be configured to fast-switch a client signal from a failed transmitter/receiver module, e.g., transponder and layer 1/2/3 switches, line equipment (ROADM), fiber or optical path to another working transmitter/receiver module, line equipment and/or fiber path. In some examples, switch 612 may include a controller (not shown) and/or a software control mechanism configured to dynamically configure/re-configure, orchestrate, and recompute switch states and positions across multiple data centers and locations based on and Optimized Network Path automatically calculated as the feedback a path computation engine, and/or to arbitrate multiple types of clients, client traffic rates, formats and match the clients to appropriate DWDM modules.

Figure 7:
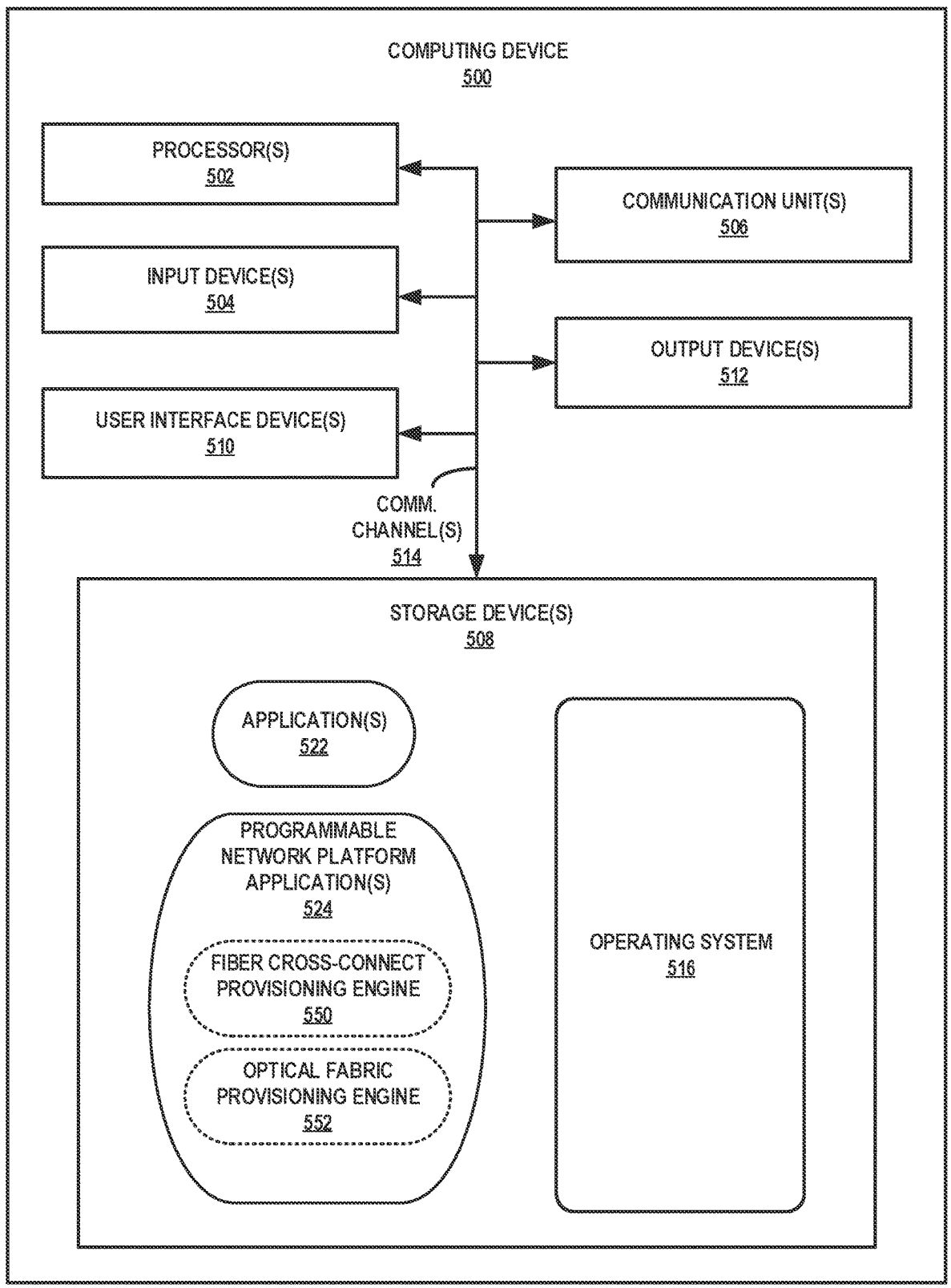
FIG. 7 is a block diagram illustrating further details of one example of a computing device that operates in accordance with one or more techniques of the present disclosure.

FIG. 7 is a block diagram illustrating further details of one example of a computing device that operates in accordance with one or more techniques of the present disclosure. FIG. 7 may illustrate a particular example of a server or other computing device 500 that includes one or more processor(s) 502 for executing any one or more of PNP 3 or any other computing device described herein. Other examples of computing device 500 may be used in other instances. Although shown in FIG. 7 as a stand-alone computing device 500 for purposes of example, a computing device may be any component or system that includes one or more processors or other suitable computing environment for executing software instructions and, for example, need not necessarily include one or more elements shown in FIG. 7 (e.g., communication units 506; and in some examples components such as storage device(s) 508 may not be co-located or in the same chassis as other components).

As shown in the specific example of FIG. 7, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, programmable network platform application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and programmable network platform application(s) 524 with processors 502, communication unit 506, storage device 508, input device 504, user interface devices 510, and output device 512.

Application 522 and programmable network platform application(s) 524 may also include program instructions and/or data that are executable by computing device 500. Example programmable network platform application(s) 524 executable by computing device 500 may include any one or more of an orchestration engine module, API gateway module, and sub-systems; or in the illustrated architecture to include fiber cross-connect provisioning engine 550 or optical fabric provisioning engine 552, each illustrated with dashed lines to indicate that these may or may not be executable by any given example of computing device 500.

Fiber cross-connect provisioning engine 550 may include instructions for causing computing device 500 to perform one or more of the operations and actions described in the present disclosure with respect to provisioning optical cross-connections with any one of switches 12, 312, 412, 512, and 612. Optical fabric provisioning engine 552 may include instructions for causing computing device 500 to perform one or more of the operations and actions described in the present disclosure with respect to optical fabric provisioning with any one of switches 12, 312, 412, 512, and 612.

Figure 8:
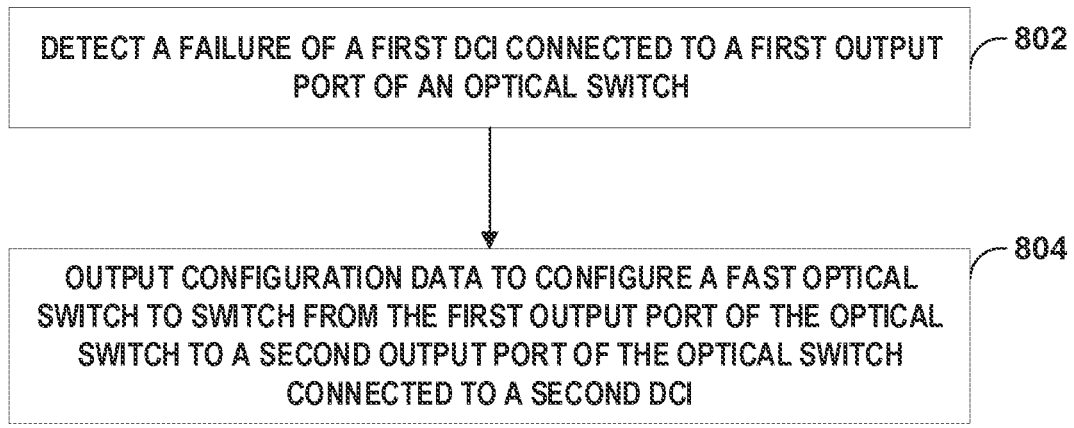
FIG. 8 is a flowchart of an example mode of operation of an optical switch, in accordance with one or more techniques of the disclosure.

FIG. 8 is a flowchart of an example mode of operation of an optical switch, in accordance with one or more techniques of the disclosure. FIG. 8 is described with respect to optical switch 612, slow switch 202, fast switches A and B of FIG. 6 and controller 240 illustrated in FIG. 2A. However, the example technique of FIG. 8 may be used with other switches and controllers, e.g., any of switches 12, 312, 412, and/or 512.

A controller may detect a failure of a first DCI connected to a first output port of an optical switch (802). For example, the controller may detect faults and/or failures in transmission and receiving equipment, e.g., transponder and layer 1/2/3 switches), line equipment (ROADM/AMP/Mux/Demux), or optical fibers.

The controller may output configuration data to configure a fast optical switch of the optical switch to switch from the first output port of the optical switch connected to the first data center interconnect to a second output port of the optical switch connected to a second data center interconnect (804). For example, the controller may fast-switch a client signal from a failed transmitter/receiver module, e.g., transponder and layer 1/2/3 switches, line equipment (ROADM), fiber or optical path to another working transmitter/receiver module, line equipment and/or fiber path.

The following examples are described herein.

Example 1

An optical switch including: a plurality of input ports and a plurality of output ports; a cross-connect fabric having one or more inputs, one or more outputs, and a device to selectively cross-connect the inputs with the outputs; an integrated fast optical switch comprising a first input, a first output, and a second output, wherein the first input is connected to a first one of the outputs of the cross-connect fabric, and wherein the integrated fast optical switch has a switching time that is less than a switching time of the cross-connect fabric to switch the first input between the first output on a path to a first output port of the plurality of output ports and the second output on a path to a second output port of the plurality of output ports.

Example 2

The optical switch of example 1, wherein the first output of the fast optical switch is connected to a first input of the one or more inputs of the cross-connect fabric, and wherein the second output of the fast optical switch is connected to a second, different input of the one or more inputs of the cross-connect fabric.

Example 3

The optical switch of example 1 or example 2, wherein cross-connect fabric is configured with an optical cross connection, from one of the one or more inputs to one of the one or more outputs, that bypasses the fast optical switch.

Example 4

The optical switch of any one of examples 1 through 3, wherein the cross-connect fabric is configured with at least one redundant optical cross connection corresponding to at least one optical cross connection configured in the fast optical switch, wherein the at least one redundant optical cross connection bypasses the fast optical switch.

Example 5

The optical switch of any one of examples 1 through 4, wherein the fast optical switch is configured to switch optical cross connections via beam steering.

Example 6

The optical switch of any one of examples 1 through 5, wherein the fast optical switch is configured to switch a plurality of optical cross connections simultaneously.

Example 7

The optical switch of any one of examples 1 through 6, wherein the fast optical switch is a first fast optical switch comprising a switching time that is less than 1000 milliseconds, the optical switch further including: a second integrated fast optical switch comprising a switching time that is less than 1000 milliseconds, wherein the second fast optical switch provides redundancy for the first fast optical switch.

Example 8

The optical switch of example 7, wherein respective inputs of the first fast optical switch and the second fast optical switch are configured to be connected to at least one output port of the cross-connect fabric, wherein the first output and the second output of the first fast optical switch are connected to at least one input port of the cross-connect fabric, and wherein each output of the second fast optical switch is connected to at least one input port of the cross-connect fabric.

Example 9

The optical switch of example 8, wherein the cross-connect fabric is configured to maintain at least one first redundant optical cross connection corresponding to at least one optical cross connection maintained by the first fast optical switch, wherein the at least one redundant optical cross connection bypasses the first fast optical switch, wherein the cross connect fabric is configured to maintain at least one second redundant optical cross connection corresponding to at least one optical cross connection maintained by the second fast optical switch, wherein the at least one redundant optical cross connection bypasses the second fast optical switch.

Example 10

The optical switch of any one of examples 1 through 9, wherein a second one of the outputs of the cross-connect fabric is directly connected to a third output port of the plurality of output ports, wherein the cross-connect fabric is configurable to switch from the first one of the outputs of the cross-connect fabric and the second one of the outputs of the cross-connect fabric to bypass the fast optical switch.

Example 11

The optical switch of any one of examples 1 through 10, wherein the path to the first output port of the plurality of output ports includes a path through the cross-connect fabric.

Example 12

The optical switch of any one of examples 1 through 11, wherein the fast optical switch comprises a photonic switch.

Example 13

An interconnection system including: a first data center interconnect; a second, different data center interconnect; an optical switch including: a plurality of input ports and a plurality of output ports; a cross-connect fabric having one or more inputs, one or more outputs, and a robotic mechanism to cross-connect the inputs to the outputs; an integrated fast optical switch comprising a first input, a first output, and a second output, wherein the first input is connected to a first one of the outputs of the cross-connect fabric, and wherein the fast optical switch has a switching time that is less than 1000 milliseconds to switch the first input between the first output on a path to a first output port of the plurality of output ports and the second output on a path to a second output port of the plurality of output ports, wherein the first output port of the plurality of output ports is connected to the first data center interconnect, and wherein the second output port of the plurality of output ports is connected to the second data center interconnect.

Example 14

The interconnection system of example 13, further including: a patch panel that includes the optical switch.

Example 15

The interconnection system of example 13 or example 14, further including: a controller comprising processing circuitry and configured to output configuration data to configure the optical switch to cause the fast optical switch from the first output to the second output.

Example 16

The interconnection system of any one of examples 13 through 15, further including: a controller comprising processing circuitry and configured to output, in response to determining the first data center interconnect has failed, configuration data to configure the optical switch to cause the fast optical switch to switch from the first output to the second output.

Example 17

A controller including: processing circuitry coupled to a memory, the processing circuitry and memory configured to control a optical switch including: a plurality of input ports and a plurality of output ports; a cross-connect fabric having one or more inputs, one or more outputs, and a robotic mechanism to cross-connect the inputs to the outputs; an integrated fast optical switch comprising a first input, a first output, and a second output, wherein the first input is connected to a first one of the outputs of the cross-connect fabric, and wherein the fast optical switch has a switching time that is less than 1000 milliseconds to switch the first input between the first output on a path to a first output port of the plurality of output ports and the second output on a path to a second output port of the plurality of output ports.

Example 18

The controller of example 17, wherein the processing circuitry and memory are configured to assign inputs and outputs of the cross-connect fabric and of the fast optical switch to form an optical sub-network including at least one optical cross connection that can be switched by reconfiguring the fast optical switch.

Example 19

The controller of example 17 or example 18, wherein the controller is configured to reassign at least one optical cross connection of the sub-network to at least one redundant optical cross connection that bypasses the fast optical switch.

Example 20

A method including: detecting, by a controller for an optical switch, a failure of a first data center interconnect connected to a first output port of the optical switch; and in response to the detecting the failure, outputting, by the controller for the optical switch, configuration data to configure a fast optical switch of the optical switch to switch from the first output port of the optical switch connected to the first data center interconnect to a second output port of the optical switch connected to a second data center interconnect.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. An optical switch comprising:
    a plurality of input ports and a plurality of output ports;
    a cross-connect fabric having one or more fabric inputs, one or more fabric outputs, and a device to selectively cross-connect the fabric inputs with the fabric outputs, wherein a first one of the fabric inputs of the cross-connect fabric is connected to a first input port of the plurality of input ports of the optical switch;
    an integrated fast optical switch comprising a first fast optical switch input, a first fast optical switch output, and a second fast optical switch output,
    wherein the first fast optical switch input is connected to a first one of the fabric outputs of the cross-connect fabric, and
    wherein the integrated fast optical switch has a switching time that is less than a switching time of the cross-connect fabric to switch the first fast optical switch input between the first fast optical switch output on a path to a first output port of the plurality of output ports and the second fast optical switch output on a path to a second output port of the plurality of output ports.

2. The optical switch of claim 1,
    wherein the first fast optical switch output of the fast optical switch is connected to a first fabric input of the one or more fabric inputs of the cross-connect fabric, and
    wherein the second fast optical switch output of the fast optical switch is connected to a second, different fabric input of the one or more fabric inputs of the cross-connect fabric.

3. The optical switch of claim 1, wherein cross-connect fabric is configured with an optical cross connection, from one of the one or more fabric inputs to one of the one or more fabric outputs, that bypasses the fast optical switch.

4. The optical switch of claim 1, wherein the cross-connect fabric is configured with at least one redundant optical cross connection corresponding to at least one optical cross connection configured in the fast optical switch, wherein the at least one redundant optical cross connection bypasses the fast optical switch.

5. The optical switch of claim 1, wherein the fast optical switch is configured to switch optical cross connections via beam steering.

6. The optical switch of claim 1, wherein the fast optical switch is configured to switch a plurality of optical cross connections simultaneously.

7. The optical switch of claim 1, wherein the fast optical switch is a first fast optical switch comprising a switching time that is less than 1000 milliseconds, the optical switch further comprising:
    a second integrated fast optical switch comprising a switching time that is less than 1000 milliseconds,
    wherein the second fast optical switch provides redundancy for the first fast optical switch.

8. The optical switch of claim 7, wherein respective fast optical switch inputs of the first fast optical switch and the second fast optical switch are configured to be connected to at least one of the fabric outputs of the cross-connect fabric, wherein the first fast optical switch output and the second fast optical switch output of the first fast optical switch are connected to at least one of the fabric inputs of the cross-connect fabric, and wherein each fast optical switch output of the second fast optical switch is connected to at least one of the fabric inputs of the cross-connect fabric.

9. The optical switch of claim 8, wherein the cross-connect fabric is configured to maintain at least one first redundant optical cross connection corresponding to at least one optical cross connection maintained by the first fast optical switch, wherein the at least one redundant optical cross connection bypasses the first fast optical switch,
    wherein the cross-connect fabric is configured to maintain at least one second redundant optical cross connection corresponding to at least one optical cross connection maintained by the second fast optical switch, wherein the at least one redundant optical cross connection bypasses the second fast optical switch.

10. The optical switch of claim 1,
wherein a second one of the fabric outputs of the cross-connect fabric is directly connected to a third output port of the plurality of output ports,
wherein the cross-connect fabric is configurable to switch from the first one of the fabric outputs of the cross-connect fabric and the second one of the fabric outputs of the cross-connect fabric to bypass the fast optical switch.

11. The optical switch of claim 1, wherein the path to the first output port of the plurality of output ports includes a path through the cross-connect fabric.

12. The optical switch of claim 1, wherein the fast optical switch comprises a photonic switch.

13. An interconnection system comprising:
a first data center interconnect;
a second, different data center interconnect;
an optical switch comprising:
    a plurality of input ports and a plurality of output ports;
    a cross-connect fabric having one or more fabric inputs, one or more fabric outputs, and a robotic mechanism to cross-connect the fabric inputs to the fabric outputs,
wherein a first one of the fabric inputs of the cross-connect fabric is connected to a first input port of the plurality of input ports of the optical switch;
    an integrated fast optical switch comprising a first fast optical switch input, a first fast optical switch output, and a second fast optical switch output,
    wherein the first fast optical switch input is connected to a first one of the fabric outputs of the cross-connect fabric, and
    wherein the fast optical switch has a switching time that is less than 1000 milliseconds to switch the first fast optical switch input between the first fast optical switch output on a path to a first output port of the plurality of output ports and the second fast optical switch output on a path to a second output port of the plurality of output ports,
wherein the first output port of the plurality of output ports is connected to the first data center interconnect, and
wherein the second output port of the plurality of output ports is connected to the second data center interconnect.

14. The interconnection system of claim 13, further comprising:
a patch panel that includes the optical switch.

15. The interconnection system of claim 13, further comprising:
a controller comprising processing circuitry and configured to output configuration data to configure the optical switch to cause the fast optical switch from the first fast optical switch output to the fast optical switch second output.

16. The interconnection system of claim 13, further comprising:

a controller comprising processing circuitry and configured to output, in response to determining the first data center interconnect has failed, configuration data to configure the optical switch to cause the fast optical switch to switch from the first fast optical switch output to the second fast optical switch output.

17. A controller comprising:
processing circuitry coupled to a memory, the processing circuitry and memory configured to control an optical switch comprising:
a plurality of input ports and a plurality of output ports;
    a cross-connect fabric having one or more fabric inputs, one or more fabric outputs, and a robotic mechanism to cross-connect the fabric inputs to the fabric outputs,
wherein a first one of the fabric inputs of the cross-connect fabric is connected to a first input port of the plurality of input ports of the optical switch;
    an integrated fast optical switch comprising a first fast optical switch input, a first fast optical switch output, and a second fast optical switch output,
    wherein the first fast optical switch input is connected to a first one of the fabric outputs of the cross-connect fabric, and
    wherein the fast optical switch has a switching time that is less than 1000 milliseconds to switch the first fast optical switch input between the first fast optical switch output on a path to a first output port of the plurality of output ports and the second fast optical switch output on a path to a second output port of the plurality of output ports.

18. The controller of claim 17, wherein the processing circuitry and memory are configured to assign fabric inputs and fabric outputs of the cross-connect fabric and of the fast optical switch to form an optical sub-network including at least one optical cross connection that can be switched by reconfiguring the fast optical switch.

19. The controller of claim 17, wherein the controller is configured to reassign at least one optical cross connection of the sub-network to at least one redundant optical cross connection that bypasses the fast optical switch.

20. A method comprising:
detecting, by a controller for an optical switch, a failure of a first data center interconnect connected to a first output port of the optical switch; and
in response to the detecting the failure, outputting, by the controller for the optical switch, configuration data to configure a fast optical switch of the optical switch to switch from the first output port of the optical switch connected to the first data center interconnect to a second output port of the optical switch connected to a second data center interconnect, wherein a first input of the fast optical switch is connected to a first fabric output of a cross-connect fabric, wherein a first fabric input of the cross-connect fabric is connected to a first input port of the optical switch, and wherein the first fabric input is on a path to the first output port and the second output port.

* * * * *